United States Patent
Chen et al.

(10) Patent No.: US 12,143,156 B2
(45) Date of Patent: Nov. 12, 2024

(54) MULTI-POINT SELF-CALIBRATION FOR BROADBAND OPTICAL SENSOR INTERROGATOR

(71) Applicant: Rockwell Collins, Inc., Cedar Rapids, IA (US)

(72) Inventors: Wenlu Chen, Clarksville, MD (US); Oliver S. King, Frederick, MD (US); Mark A. Laliberte, Reston, VA (US); Joseph W. Heming, Columbia, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 329 days.

(21) Appl. No.: 17/727,377

(22) Filed: Apr. 22, 2022

(65) Prior Publication Data

US 2022/0247498 A1   Aug. 4, 2022

Related U.S. Application Data

(63) Continuation-in-part of application No. 17/145,090, filed on Jan. 8, 2021, now abandoned.

(51) Int. Cl.
  *H04B 10/61* (2013.01)
  *H04B 10/556* (2013.01)
  (Continued)

(52) U.S. Cl.
  CPC ....... *H04B 10/614* (2013.01); *H04B 10/5561* (2013.01); *H04B 10/572* (2013.01); *H04J 14/0204* (2013.01)

(58) Field of Classification Search
  CPC .......... H04B 10/614; H04B 10/5561; H04B 10/572; H04B 10/07957; H04J 14/0204;
  (Continued)

(56) References Cited

U.S. PATENT DOCUMENTS

| | | | |
|---|---|---|---|
| 5,363,191 A | 11/1994 | Refregier et al. | |
| 5,418,868 A | 5/1995 | Cohen et al. | |

(Continued)

FOREIGN PATENT DOCUMENTS

| | | |
|---|---|---|
| CN | 103884450 A | 6/2014 |
| CN | 203745103 U | 7/2014 |

(Continued)

OTHER PUBLICATIONS

Extended European Search Report dated Sep. 15, 2023; European Application No. 23169450.6.

(Continued)

*Primary Examiner* — Mohamed K Amara
(74) *Attorney, Agent, or Firm* — Suiter Swantz IP

(57) ABSTRACT

A system and method for wavelength detection includes one or more detection stages configured for receiving at least a portion of an optical carrier. Each stage includes a splitter for splitting the signal into two arms. A 90-degree optical hybrid and in-phase (I-channel)/quadrature (Q-channel) differential detectors generate I-channel and Q-channel differential signals based on the hybrid outputs. A gas cell or like multi-point wavelength reference path also receives the input signal and provides a set of reference absorption wavelengths converted into the electrical domain by a reference photodetector. A logic device receives sets of detection signals (including I-channel and Q-channel differential signals and the set of reference wavelengths, all corresponding to a common measurement time) and determines a wavelength of the optical carrier based on an arctangent of a ratio of the Q-channel and I-channel differential signals, mapped to the set of reference absorption wavelengths.

16 Claims, 15 Drawing Sheets

(51) Int. Cl.
*H04B 10/572* (2013.01)
*H04J 14/02* (2006.01)

(58) Field of Classification Search
CPC . G01D 18/002; G01D 5/35316; G01J 9/0246; G01B 9/02; G02F 1/225
See application file for complete search history.

(56) References Cited

U.S. PATENT DOCUMENTS

| | | | |
|---|---|---|---|
| 5,583,683 A * | 12/1996 | Scobey | G02B 6/2938 |
| | | | 398/79 |
| 5,920,411 A * | 7/1999 | Duck | G02B 6/29364 |
| | | | 398/79 |
| 6,421,120 B1 | 7/2002 | Wildnauer | |
| 6,870,629 B1 | 3/2005 | Vogel et al. | |
| 6,900,898 B2 | 5/2005 | Ahmadvand et al. | |
| 7,301,639 B1 | 11/2007 | Kebabian et al. | |
| 7,558,479 B1 | 7/2009 | Robinson | |
| 7,596,323 B1 | 9/2009 | Price et al. | |
| 8,457,453 B2 | 6/2013 | Lipson et al. | |
| 9,178,611 B2 | 11/2015 | Reaves et al. | |
| 10,142,032 B2 | 11/2018 | Kato et al. | |
| 10,263,385 B1 | 4/2019 | Chen et al. | |
| 10,365,088 B2 | 7/2019 | Ding et al. | |
| 10,502,632 B2 * | 12/2019 | Seeley | H01S 5/0617 |
| 10,505,340 B2 | 12/2019 | Parker et al. | |
| 10,578,494 B1 | 3/2020 | Tiemann et al. | |
| 10,612,906 B2 | 4/2020 | Janssen | |
| 10,754,091 B1 | 8/2020 | Nagarajan | |
| 10,767,974 B1 | 9/2020 | Chen et al. | |
| 11,128,383 B2 | 9/2021 | Gupta et al. | |
| 2003/0138250 A1 | 7/2003 | Glynn | |
| 2004/0004721 A1 | 1/2004 | Lefevre et al. | |
| 2004/0208421 A1 | 10/2004 | Kitagawa | |
| 2005/0127908 A1 | 6/2005 | Schlicker et al. | |
| 2006/0044562 A1 * | 3/2006 | Hagene | G01N 21/39 |
| | | | 356/437 |
| 2006/0056845 A1 | 3/2006 | Parsons et al. | |
| 2010/0014802 A1 | 1/2010 | Chapman et al. | |
| 2011/0122906 A1 | 5/2011 | Seeley et al. | |
| 2012/0106984 A1 | 5/2012 | Jones et al. | |
| 2014/0212092 A1 | 7/2014 | Roth et al. | |
| 2015/0019160 A1 | 1/2015 | Thurner et al. | |
| 2015/0104177 A1 | 4/2015 | Kato et al. | |
| 2015/0349485 A1 * | 12/2015 | Selwan | H01S 5/06804 |
| | | | 372/20 |
| 2017/0356739 A1 * | 12/2017 | Deck | G01B 9/0207 |
| 2018/0100967 A1 | 4/2018 | Parker et al. | |
| 2018/0102627 A1 | 4/2018 | Parker et al. | |
| 2018/0102628 A1 | 4/2018 | Parker et al. | |
| 2018/0214062 A1 | 8/2018 | Keating et al. | |
| 2019/0052053 A1 | 2/2019 | Parker et al. | |
| 2022/0186612 A1 | 6/2022 | Maida, Jr. et al. | |
| 2022/0192504 A1 | 6/2022 | Kim et al. | |

FOREIGN PATENT DOCUMENTS

| | | |
|---|---|---|
| CN | 104568219 A | 4/2015 |
| CN | 204422100 U | 6/2015 |
| JP | 2000292632 A | 10/2000 |
| KR | 1020050040522 A | 5/2005 |
| NO | 2009105633 A2 | 8/2009 |
| WO | 2020118807 A1 | 6/2020 |

OTHER PUBLICATIONS

Guha, Biswajeet et al., "Minimizing temperature sensitivity of silicon Mach-Zehnder interferometers", Optics Express, vol. 18, No. 3, Feb. 1, 2010, pp. 1879-1887.

Hiraki, Tatsurou et al., "Small sensitivity to temperature variations of Si-photonic Mach-Zehnder interferometer using Si and SiN", Frontiers in Materials, Mar. 2015, vol. 2, Article 26.

* cited by examiner

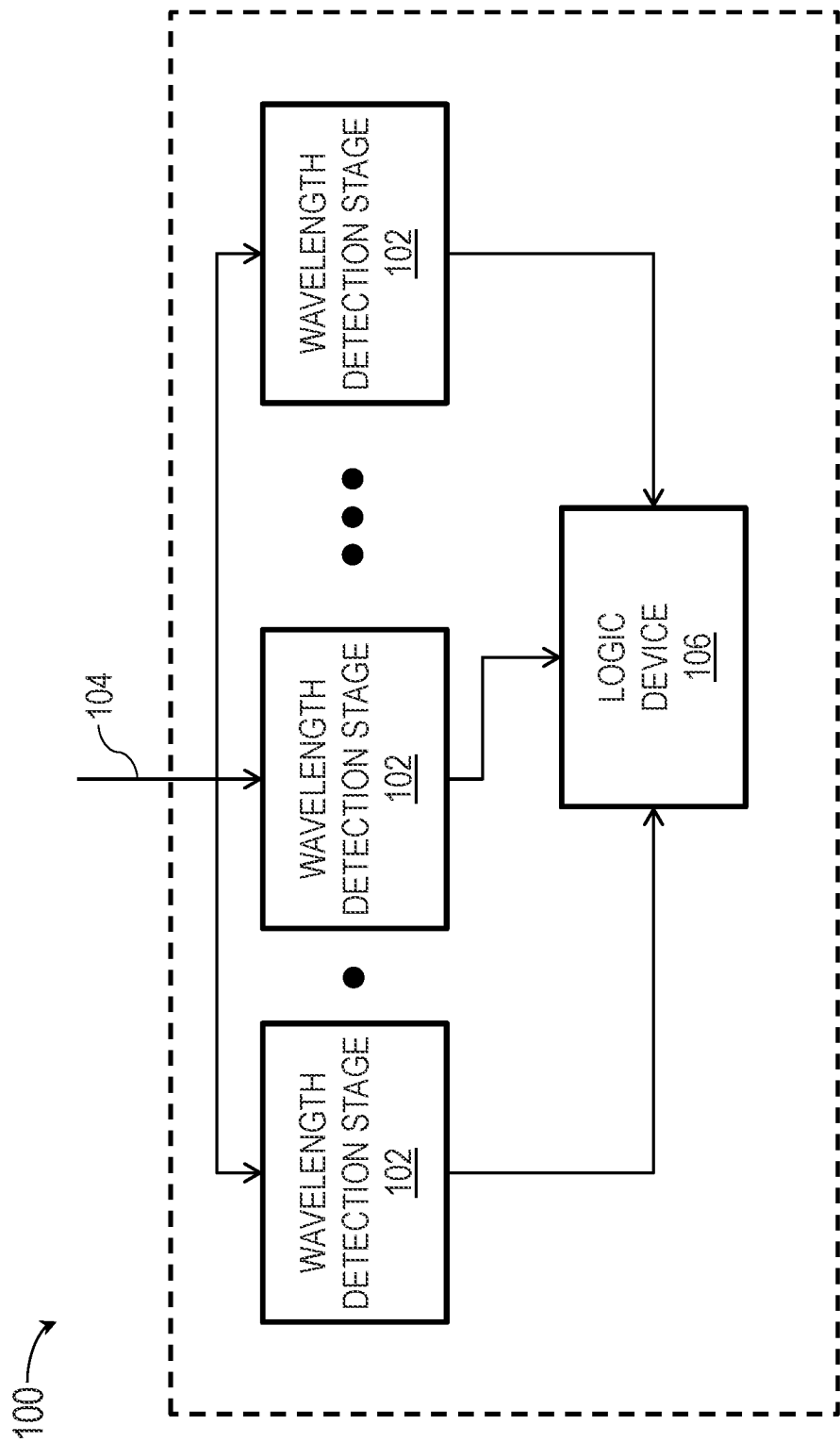

1300

1302 — Receiving at least one portion of an optical carrier via one or more wavelength detection stages, each wavelength detection stage comprising:
- a splitter configured to split the at least one portion of the optical carrier into a first arm and a second arm, wherein a free spectral range (FSR) associated with the respective wavelength detection stage is associated with an optical path length difference between the first and second arms
- a 90-degree optical hybrid configured to receive the at least one portion of the optical carrier from the first arm and the second arm, the 90-degree optical hybrid configured to provide two I-channel outputs and two Q-channel outputs
- an I-channel differential photodetector configured to generate an I-channel differential signal based on a difference between the two I-channel outputs
- a Q-channel differential photodetector configured to generate a Q-channel differential signal based on a difference between the two Q-channel outputs
- a multipoint wavelength reference configured to receive the portion of the optical carrier and provide a set of reference absorption wavelengths corresponding to the optical carrier
- a reference photodetector configured to receive the set of reference absorption wavelengths and provide a corresponding set of reference absorption wavelengths in the electrical domain
- an I-channel analog-digital converter (ADC) configured to digitize the I-channel differential signal
- a Q-channel ADC configured to digitize the Q-channel differential signal
- a reference ADC configured to digitize the set of absorption wavelengths

1304 — Receiving, via a logic device in communication with the one or more wavelength detection stages, one or more sets of detection signals, each set of detection signals comprising:
- the digitized I-channel differential signal
- the digitized Q-channel differential signal
- the digitized set of reference absorption wavelengths;

each set of detection signals corresponding to a measurement time of the optical carrier 1306 — Determining for each set of detection signals, via the logic device, at least one wavelength of the associated optical carrier based on:
- an arctangent of a ratio of the I-channel differential signal and the Q-channel differential signal
- the set of absorption wavelengths

FIG. 13B

MULTI-POINT SELF-CALIBRATION FOR BROADBAND OPTICAL SENSOR INTERROGATOR

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. patent application Ser. No. 17/145,090 filed Jan. 8, 2021 and entitled ATHERMAL WIDE RANGE OPTICAL WAVELENGTH FAST DETECTION FOR NARROWBAND SIGNAL.

Said U.S. patent application Ser. No. 17/145,090 is herein incorporated by reference in its entirety.

BACKGROUND

Optical wavelength detection of narrowband signals (e.g., optical signals having a narrow bandwidth of wavelengths) is widely useful for many applications including, but not limited to, optical sensing and metrology. For example, optical sensors based on Fiber Bragg Gratings (FBGs) may output a narrowband optical signal where the wavelength is directly related to a measured property of interest. Such sensors may be utilized by detecting the wavelength of the output light and correlating the wavelength to the property of interest based on a calibration curve, a lookup table, one or more calculations, or any other desired technique.

For example, optical wavelength detection may be performed by a Photonic Integrated Circuit (PIC). However, environmental factors, e.g., temperature change and/or stress on the PIC and/or its packaging, may shift the wavelength response of the PIC output. For example, thermal shift and/or stress may shift the wavelength output relative to a fixed calibration wavelength curve. Stress-related or thermal wavelength shift may be minimized by introducing athermal design to PIC components. For example, the PIC may incorporate different materials in the arms of a wavelength detection circuit, e.g., with different effective indexes or temperature sensitivities. However, while thermally induced phase shift may be reduced by athermal design, thermally induced phase shift is not eliminated entirely. Further, athermal design does not address the effect of stress-induced shift within the PIC.

SUMMARY

In a first aspect, a wavelength detection system incorporating multi-point self-calibration is disclosed. In embodiments, the wavelength detection system includes one or more wavelength detection stages and a logic device for receiving the output of each wavelength detection stage. Each wavelength detection stage receives a portion of a narrow wavelength band optical carrier and includes an unbalanced interferometer comprised of a splitter for splitting the optical carrier into a first arm and a second arm having an optical path length difference (OPD) associated with a free spectral range (FSR) of the interferometer. Each stage includes a 90-degree optical hybrid for receiving the output of the first and second arms and generating therefrom two in-phase channel (I-channel) outputs and two quadrature channel (Q-channel) outputs. I-channel and Q-channel differential photodetector pairs generate, based on differences between the I-channel and Q-channel outputs, I-channel and Q-channel differential signals. Each stage includes a multi-point wavelength reference path for receiving a portion of the optical carrier and providing a set of environmentally insensitive absorption wavelengths (e.g., unaffected by temperature, stress, or other environmental factors that might otherwise affect the I-channel and Q-channel differential signal output). Each stage includes a reference photodetector for converting the set of absorption wavelengths from the optical to the electrical domain. Each stage includes I-channel, Q-channel, and reference analog-digital converters (ADC) for respectively receiving and digitizing the I-channel differential signal, Q-channel differential signal, and set of absorption wavelengths. In embodiments, the logic device receives a set of detection signals from each wavelength detection stage, each set including a digitized the I-channel differential signal, Q-channel differential signal, and set of absorption wavelengths all corresponding to a common measurement time of the optical carrier. For each set of detection signals, the logic device determines an output corresponding to a wavelength of the optical carrier based on an arctangent of the ratio of the I-channel and Q-channel differential signals and the set of absorption wavelengths.

In some embodiments, the optical carrier is generated by a swept wavelength tunable laser source configured for substantially linear output across a defined wavelength range over the measurement time.

In some embodiments, the logic device determines the wavelength of the optical carrier by mapping a first and second arctangent of the ratio of the I-channel and Q-channel differential signals (corresponding to first and second calibration times respectively) to first and second absorption wavelengths from the set of absorption wavelengths.

In some embodiments, the logic device determines the wavelength of the optical carrier by interpolating an intermediate wavelength between the first and second absorption wavelengths, the intermediate wavelength corresponding to a timestamp between the first and second calibration times.

In some embodiments, the set of detection signals reflects a phase shift (e.g., in the I-channel and Q-channel differential signals, and therefore the arctangent of the I-channel/Q-channel ratio, due to temperature, stress, or other like environmental effects on the arms of the interferometer. The determination of the wavelength incorporating the set of absorption wavelengths cancels out the phase shift in the arctangent (and any wavelength measurement error resulting from the phase shift).

In some embodiments, the phase-shifted arctangent of the ratio of the I-channel and Q-channel differential signals is substantially non-linear over time.

In some embodiments, the wavelength detection stages are embodied in a photonic integrated circuit (PIC).

In some embodiments, each 90-degree optical hybrid includes: a first splitter for splitting the optical carrier in the first arm into first and second optical paths; a second splitter for splitting the optical carrier in the second arm into third and fourth optical paths; a phase delay for introducing a 90-degree phase shift into the optical carrier in the second optical path; a first coupler for receiving the optical carrier from the first and third optical paths and outputting the two I-channel outputs; a second coupler for receiving the optical carrier from the (phase-shifted) second and fourth optical paths and outputting the two Q-channel outputs.

In some embodiments, the first arm is at least partially formed of a first material and the second arm is at least partially formed of a second material, the first and second arms differing in length and the first and second materials differing with respect to group index, thermal sensitivity, and/or other like distinctive properties.

In a further aspect, a wavelength detection method incorporating multi-point self-calibration is also disclosed. In embodiments, the method includes receiving a portion of an optical carrier via one or more wavelength detection stage, each wavelength detection stage including: a splitter for splitting the optical carrier into first and second arms of an unbalanced interferometer, where the first and second arms have a difference in optical path length (OPD) associated with a free spectral range (FSR) of the interferometer; a 90-degree optical hybrid for receiving the output of the first and second arms and generating therefrom two in-phase channel (I-channel) outputs and two quadrature channel (Q-channel) outputs; differential photodetector pairs (I-channel and Q-channel) for generating I-channel and Q-channel differential signals based on differences between the I-channel and Q-channel outputs; a multi-point wavelength reference path for receiving a portion of the optical carrier and providing a set of environmentally insensitive absorption wavelengths (e.g., unaffected by temperature, stress, or other environmental factors that might otherwise affect the I-channel and Q-channel differential signal output); a reference photodetector for converting the set of absorption wavelengths from the optical to the electrical domain; I-channel and Q-channel analog-digital converters (ADC) for digitizing the electrical I-channel and Q-channel differential signals; and a reference ADC for digitizing the set of absorption wavelengths. The method includes receiving, via a logic device, one or more sets of detection signals from each wavelength detection stage, each set of detection signals including a digitized I-channel differential signal, Q-channel differential signal, and set of absorption wavelengths (all corresponding to a common measurement time of the optical carrier). The method includes determining, for each received set of detection signals, a wavelength of the optical carrier based on an arctangent of a ratio of the I-channel and Q-channel differential signals and the set of absorption wavelengths.

In some embodiments, the method includes receiving the optical carrier (or portions thereof) from a swept wavelength tunable laser source having a linear output across a defined wavelength range over a measurement time.

In some embodiments, the method includes mapping a first and second arctangent (e.g., of the ratio of the I-channel/Q-channel differential signals), the first and second arctangents corresponding to first and second measurement times, to first and second absorption wavelengths from the set of absorption wavelengths.

In some embodiments, the method includes interpolating an intermediate wavelength between the first and second mapped absorption wavelengths, the intermediate wavelength corresponding to an intermediate timestamp between the first and second measurement times.

In some embodiments, the set of detection signals reflects a phase shift (e.g., in the I-channel and/or Q-channel differential signals and the arctangent of the ratio thereof) due to temperature, stress, or other environmental effect on the first and/or second interferometer arms, and the method includes canceling out the phase shift by determining the wavelength of the optical carrier.

In some embodiments, the arctangent is substantially nonlinear as a function of time or wavelength (e.g., due to the phase shift).

In some embodiments, the first arm is at least partially formed of a first material and the second arm is at least partially formed of a second material, the first and second arms differing in length and the first and second materials differing with respect to group index, thermal sensitivity, and/or other like distinctive properties.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is made with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1 is a block diagram view of a wavelength detection system according to example embodiments of the inventive concepts disclosed herein.

and FIGS. 13A and 13B are flow diagrams illustrating a wavelength detection method according to example embodiments of the inventive concepts disclosed herein.

DETAILED DESCRIPTION

Figure 2A:
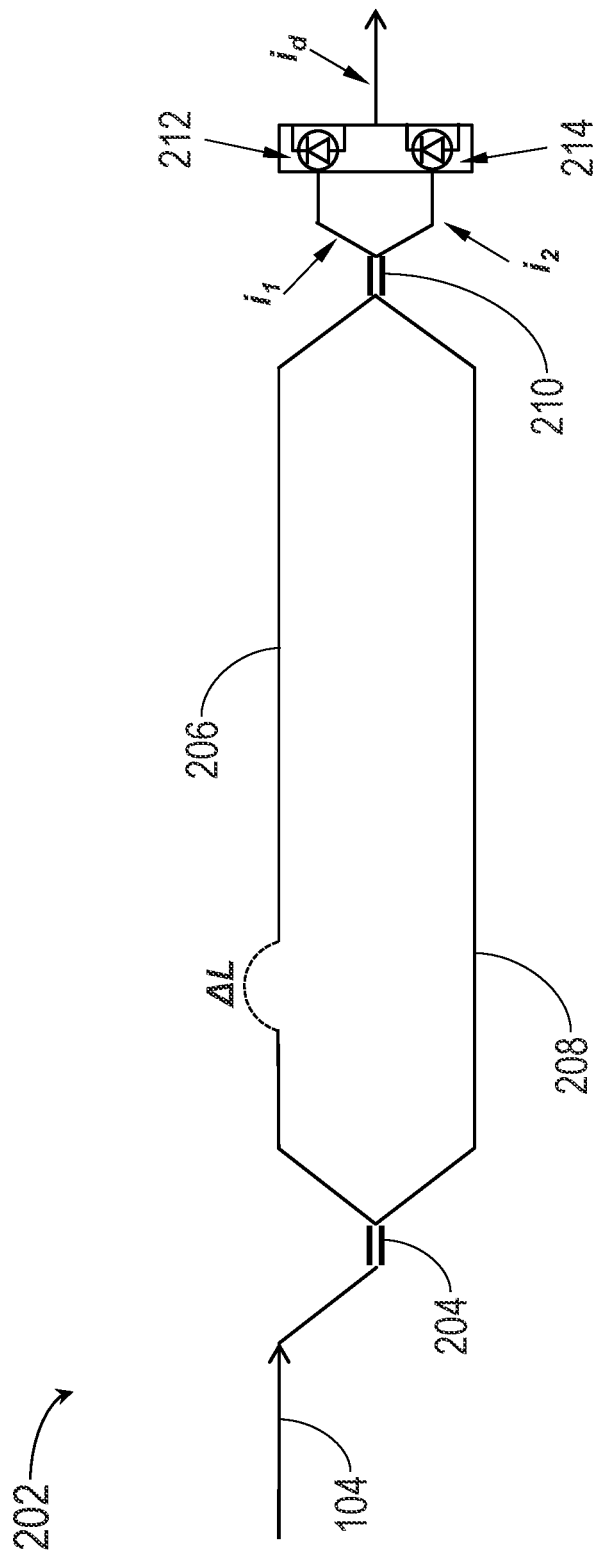
FIG. 2A is a conceptual view of an unbalanced interferometer configured according to example embodiments of the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to passive optical wavelength detection via a photonic integrated circuit (PIC) including an unbalanced interferometer with 90-degree optical hybrid providing in-phase channel (I-channel) and quadrature channel (Q-channel) signals, wherein the wavelength of the optical carrier (e.g., optical input carrier, input beam, input light) is linearly proportional to the arctangent of the ratio of I-channel and Q-channel signals; alternatively, the proportion of wavelength to arctangent may be non-linear but may be calibrated in a later process.

It is contemplated herein that wavelength detection based directly on an arctangent operation of two signals may be achieved using relatively low-cost components and may further provide fast, accurate and robust measurements without the need to perform spectrum scanning or Fast Fourier Transform (FFT) operations. Additionally, such a system may be flexibly implemented using in a variety of platforms including, but not limited to, a photonic integrated circuit platform, a fiber-based platform, a free-space platform, or a combination thereof.

Crucially, embodiments of the inventive concepts thereof incorporate a multi-point wavelength reference path to remove wavelength measurement errors due to thermal and stress effects within the PIC and/or packaging, or other environmental concerns. Incorporating multi-point wavelength calibration adds the benefits of thermal and stress insensitivity to the high resolution and accuracy provided by the PIC.

In some embodiments, a wavelength detection stage includes an unbalanced interferometer combined with a 90-degree optical hybrid. It is recognized herein that a 90-degree optical hybrid may accept two optical signals as inputs, and may provide four output signals including two in-phase outputs and two quadrature outputs. In some embodiments, an optical carrier is directed to an unbalanced interferometer having two arms with an optical path length difference (OPD) therebetween. The outputs from each arm of an unbalanced interferometer are provided as inputs to the 90-degree optical hybrid. In this configuration, a differential signal between the in-phase outputs of the 90-degree optical hybrid (e.g., an in-phase differential signal) may be represented as a sinusoidal function (e.g., a cosine function) of the wavelength of the optical carrier with a period depending on the OPD of the interferometer arms. Similarly, a differential signal between the quadrature outputs of the 90-degree optical hybrid (e.g., a quadrature differential signal) may be represented as a sinusoidal function with the same period, but 90 degrees out of phase with the in-phase differential signal. Accordingly, the wavelength of the optical carrier will be linearly proportional to the arctangent of the ratio of the in-phase differential signal and the quadrature differential signal.

A wavelength detection stage configured according to embodiments of the inventive concepts disclosed herein may have a free spectral range (FSR) equal to the period of the in-phase and quadrature differential signals, the period depending on the OPD of the arms of the interferometer. As a result, the operational range of a wavelength detection stage may be controlled, adjusted, or otherwise selected based on the OPD of the arms of the interferometer for an expected range of input wavelengths.

In some embodiments, a wavelength detection system may include multiple wavelength detection stages, each having a different OPD and thus a different FSR. It is recognized herein that a slope of the arctangent of the ratio of the in-phase differential signal and the quadrature differential signal as a function of wavelength will be linear within a spectral window associated with the FSR. Accordingly, the slope of this linear signal as a function of wavelength, which may be related to the sensitivity and/or resolution of the wavelength detection, may be inversely related to the FSR. Multiple wavelength detection stages based on multiple free spectral ranges may thus provide measurements with different sensitivities.

In some embodiments, multiple wavelength detection stages are combined to provide high detection sensitivity across a wide operational range. For example, a two-stage wavelength detection system may provide an operational range based on the stage having the larger free spectral range with the sensitivity based on the stage with the smaller free spectral range. It is contemplated herein that a wavelength detection system may have any number of stages to provide a selected or desired combination of sensitivity and spectral range.

Multiple wavelength detection stages may be implemented using multiple configurations within the spirit and scope of the present disclosure. In some embodiments, optical carriers are split or otherwise directed to multiple wavelength detection stages that operate in parallel. In some embodiments, a wavelength stage includes an adjustable optical delay line to selectively adjust the OPD and thus selectively adjust the free spectral range of the stage. In this regard, a single wavelength detection stage may sequentially generate detection signals based on multiple OPDs.

Referring now to FIG. 1, a wavelength detection system 100 is shown.

In some embodiments, the wavelength detection system 100 may include one or more wavelength detection stages 102, where each wavelength detection stage 102 may provide a series of in-phase and quadrature output signals that are related to the wavelength of a narrowband optical carrier 104 (e.g., input beam, input light, optical input carrier, optical input signal) into the wavelength detection system 100 within a certain free spectral range, or operational range. For example, the optical carrier 104 may include a laser (e.g., a narrow-linewidth laser associated with an FBG) or other like optical input having a narrow wavelength band (e.g., significantly narrower than a free spectral range (FSR) of an associated interferometer (see FIG. 2A below)).

As illustrated in FIG. 1, the wavelength detection system 100 may include any number of wavelength detection stages 102, each wavelength detection stage having a different FSR. Further, it is to be understood that although the wavelength detection stages 102 are depicted as separate blocks in FIG. 1, any wavelength detection stage 102 may be implemented as a discrete component or as a configuration of an adjustable wavelength detection stage 102. In this regard, a single physical component may operate as multiple wavelength detection stages 102.

In some embodiments, the wavelength detection system 100 may include a logic device 106 communicatively coupled to each of one or more wavelength detection stages 102 to generate an output signal indicative of the wavelength of the optical carrier 104 based on the outputs of the wavelength detection stages 102. For example, the logic device 106 may be any type of logic device suitable for generating an output signal indicative of the wavelength of the optical carrier 104 based on detection signals received from the wavelength detection stages 102.

In some embodiments, the logic device 106 may include one or more field-programmable gate arrays (FPGAs). In some embodiments, the logic device 106 may include a controller communicatively coupled to one or more processors. In another embodiment, the one or more processors may be configured to execute a set of program instructions maintained in a memory medium, or memory. Further, the controller may include one or more modules containing one or more program instructions stored in the memory medium executable by the processors. The processors of a controller may include any processing element known in the art. In this sense, the logic device 106 may include any microprocessor-type device configured to execute algorithms and/or instructions. In one embodiment, the logic device 106 may include a digital signal processor. In another embodiment, the processors include a desktop computer, mainframe computer system, workstation, image computer, parallel processor, or any other computer system (e.g., networked computer) configured to execute the various processing steps described throughout the present disclosure. It is further recognized that the term "processor" may be broadly defined to encompass any device having one or more processing elements, which execute program instructions from a non-transitory memory medium.

The memory medium may include any storage medium known in the art suitable for storing program instructions executable by the associated processors. For example, the memory medium may include a non-transitory memory medium. As an additional example, the memory medium may include, but is not limited to, a read-only memory, a random-access memory, a magnetic or optical memory device (e.g., disk), a magnetic tape, a solid-state drive and/or the like. It is further noted that the memory medium may be housed in a common controller housing with the processors. In one embodiment, the memory medium may be located remotely with respect to the physical location of the processors and/or controller. For instance, the processors may access a remote memory (e.g., server), accessible through a network (e.g., internet, intranet and the like). Therefore, the above description should not be interpreted as a limitation on the present invention but merely an illustration.

Referring now to FIG. 2A, an unbalanced interferometer 202 is shown. The unbalanced interferometer 202 may be implemented within the wavelength detection stage (102, FIG. 1) and may include an asymmetric Mach-Zehnder interferometer (AMZI) or like component. For example, an unbalanced interferometer 202 may include an input port splitter 204 to split the optical carrier 104 into a first arm 206 and a second arm 208, where the optical paths of the first arm 206 and the second arm 208 differ to provide an optical path length difference (OPD) between the two arms. The OPD may be represented as $$OPD = \Delta L \cdot n \qquad (1)$$

where $\Delta L$ is the physical path length difference between the first and second arms 206, 208 and n is the average refractive index of the first and second arms (e.g., assuming the first and second arms are identical in terms of waveguide material and dimension).

In embodiments, the splitter 204 may include any type of optical splitter known in the art suitable for evenly splitting the optical carrier 104 between the first arm 206 and the second arm 208, including (but not limited to) a 50/50 splitter, a wideband optical directional coupler, or the like.

The unbalanced interferometer 202 may further include a coupler 210 (e.g., an optical directional coupler) to combine light from the first arm 206 and the second arm 208 and provide two output signals.

In embodiments, the OPD between the two arms may be generated by any technique known in the art. Further, the unbalanced interferometer 202 with may include a fixed OPD between the two respective arms or may include one or more components for adjusting or otherwise controlling the OPD. In one embodiment, the unbalanced interferometer 202 has a fixed OPD. For example, an unbalanced interferometer 202 may include a fixed physical path length difference (ΔL) between the first arm 206 and the second arm 208.

In embodiments, the unbalanced interferometer 202 may include photodiodes 212, 214 (e.g., balanced photodiode pairs, differential photodetectors) configured for receiving the optical carrier 104 from the first and second arms 206, 208 and outputting a differential photocurrent in the electrical domain. For example, the photocurrents $i_1$ and $i_2$ at the two outputs of the coupler 210 (as measured by photodiodes 212, 214) may be characterized as:

$$\begin{bmatrix} i_1 \\ i_2 \end{bmatrix} = \begin{bmatrix} E_1 \cdot E_1^* \\ E_2 \cdot E_2^* \end{bmatrix} = \frac{\gamma}{4} E_{in}^2 \begin{bmatrix} (e^{-i\Delta\phi} - 1) \cdot (e^{i\Delta\phi} - 1) \\ (e^{-i\Delta\phi} + 1) \cdot (e^{i\Delta\phi} + 1) \end{bmatrix} \quad (2)$$

$$\begin{bmatrix} i_1 \\ i_2 \end{bmatrix} = \frac{\gamma}{2} E_{in}^2 \begin{bmatrix} 1 - \cos[\Delta\phi] \\ 1 + \cos[\Delta\phi] \end{bmatrix} \quad (3)$$

$$E_{in} = \sqrt{P_{in}}\, e^{-i\omega t} \quad (4)$$

$$\Delta\phi = 2\pi \frac{OPD}{\lambda} \quad (5)$$

where $E_1$ is the electric field at the end of the first arm 206, $E_2$ is the electric field at the end of the second arm 208, $E_{in} = \sqrt{P_{in}}\, e^{-i\omega t}$ is the electric field of the optical carrier 104, $P_{in}$ is the optical power of the optical carrier, $\omega$ is the optical angular frequency of the optical carrier, $\lambda$ is the wavelength of the optical carrier, t is time, $\gamma$ is the responsivity of the photodiodes 212, 214 (e.g., circuit loss factor), and $\Delta\phi$ is the phase difference between the first and second arms 206, 208.

Taking a differential measurement of the photocurrents $i_1$ and $i_2$ with a pair of balanced photodiodes 212, 214 provides a differential output current $i_d = i_1 - i_2$:

$$i_d = \gamma P_{in} \cos\left(2\pi \frac{(\Delta L)(n_g)}{\lambda}\right) = \gamma P_{in} \cos(\Delta\phi) \quad (6)$$

where $n_g$ is the waveguide group index of the first and second arms 206, 208. Accordingly, as shown below by FIG. 2B, the differential output current $i_d$ may be a sinusoidal function of the wavelength $\lambda$ of the optical carrier 104 (the parameter of interest) and having a period related to the OPD (ΔL) between the first arm 206 and the second arm 208.

However, as noted by commonly owned U.S. patent application Ser. No. 17/145,090, which application is herein incorporated by reference in its entirety, AMZIs and other conventional wavelength detection systems (and their components, e.g., the unbalanced interferometer 202) are sensitive to thermal drift and other environmental factors (e.g., stress). Accordingly, the differential output current $i_d$ may be a function of temperature such that:

$$i_d(T) = \gamma P_{in} \cos(\Delta\phi(T)) = \gamma P_{in} \cos\left(2\pi \frac{\Delta L \cdot n_g(T)}{\lambda}\right) \quad (7)$$

where $\Delta L = L_2 - L_1$ and $L_1$, $L_2$ are the respective optical path lengths of the first and second arms 206, 208. As shown above, the waveguide group index $n_g$ may be temperature-sensitive such that the phase difference $\Delta\phi$ between the first and second arms 206, 208 may likewise be a function of waveguide temperature, e.g., proportional to $n_g(T)(L_2 - L_1)$.

Figure 2B:
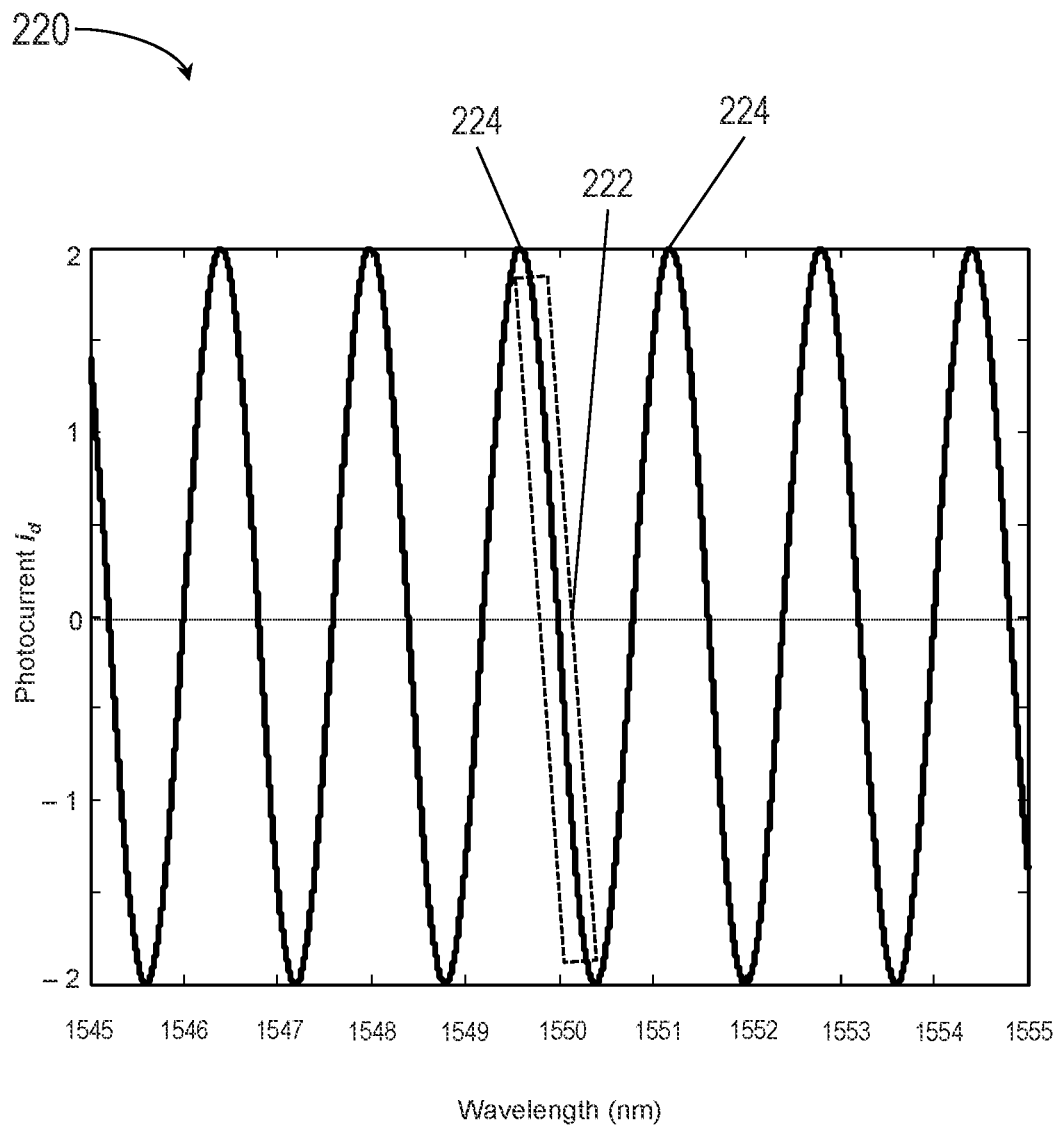
FIG. 2B is a plot of the differential measurement of the photocurrents $i_1$ and $i_2$ of the unbalanced interferometer of FIG. 2A according to example embodiments of the inventive concepts disclosed herein.

Referring now to FIG. 2B, a plot 220 is shown.

In embodiments, the plot 220 may plot the differential output current $i_d$ based on differential measurement of the photocurrents $i_1$ and $i_2$ of the unbalanced interferometer 202 of FIG. 2A according to example embodiments of the inventive concepts disclosed herein. By way of a non-limiting example, the plot 220 is centered around a wavelength of 1550 nm. Further, the plot 220 illustrates the sinusoidal dependence of the differential output current on the wavelength of the optical carrier (104, FIG. 2A). It is contemplated herein that regions 222 between the peaks 224 of the differential photocurrent may be substantially linear and may be suitable for wavelength determination in the selected regions 222. However, it may be undesirable to restrict wavelength determination to the selected regions 222.

Figure 3:
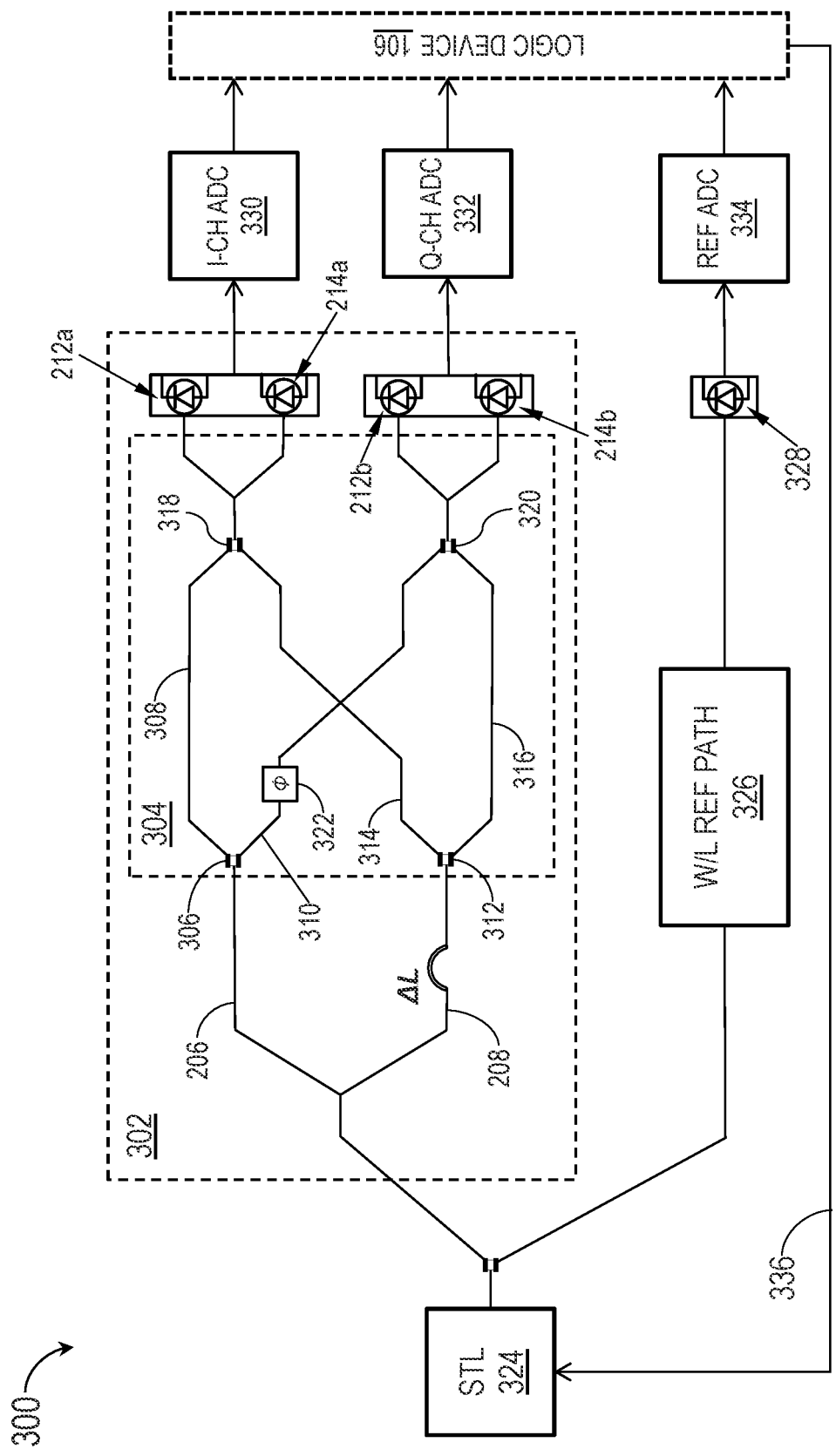
FIG. 3 is a conceptual view of a wavelength detection stage incorporating an unbalanced interferometer, 90-degree optical hybrid, and wavelength reference path according to example embodiments of the inventive concepts disclosed herein.

Referring now to FIG. 3, the wavelength detection stage 300 may be implemented similarly to the wavelength detection stage (102, FIG. 1), except that the wavelength detection stage 300 may incorporate (e.g., within a photonic integrated circuit 302 (PIC)) an unbalanced interferometer (202, FIG. 2A) and a 90-degree optical hybrid 304 (e.g., hybrid optical coupler). For example, the PIC 302 may replace the coupler (210, FIG. 2A) of the unbalanced interferometer 202 with a 90-degree optical hybrid 304.

Further, as described with respect to FIGS. 2A and 2B, the unbalanced interferometer of the PIC 302 may provide a fixed OPD between the first and second interferometer arms 206, 208. For example, at least one wavelength detection stage 102 may include an unbalanced interferometer with a fixed physical path length difference (ΔL) between the first and second arms 206, 208.

In embodiments, a wavelength detection stage 300 including a 90-degree optical hybrid 304 may accept as input an optical carrier 104 from each arm (e.g., first and second arms 206, 208) of an unbalanced interferometer as inputs, and may generate two in-phase (e.g., I-channel) signals and two quadrature (e.g., Q-channel) signals as outputs based on mixing of the optical carrier from each arm with various phase combinations. For example, the 90-degree optical hybrid 304 may include a first splitter 306 to equally split the optical carrier from the first arm 206 into a first path 308 and a second path 310, and a second splitter 312 to equally split the optical carrier from the second arm 208 into a third path 314 and a fourth path 316.

In embodiments, the 90-degree optical hybrid 304 may include a first coupler 318 to combine the optical carrier 104 from the first path 308 and the third path 314 (e.g., from the first arm 206 and the second arm 208). Further, the 90-degree optical hybrid 304 may be configured to provide no optical phase difference for the optical carrier 104 with respect to these first and third paths 308, 314. In this regard, the two outputs of the first coupler 318 may be characterized as in-phase outputs and may be described by the equations analogous to equations (2) and (3) above. The 90-degree optical hybrid 304 may additionally include a second coupler 320 to combine the optical carrier 104 from the second path 310 and the fourth path 316 (e.g., light from the first arm 206 and the second arm 208). Further, the 90-degree optical hybrid 304 may be configured to provide a 90-degree phase difference between the second and fourth paths 310, 316 by a 90-degree phase shift 322. In this regard, the two outputs of the second coupler 320 may be characterized as quadrature outputs. It is contemplated herein that the 90-degree optical hybrid 304 in the present disclosure is not limited to the illustration provided in FIG. 3. Rather, the 90-degree optical hybrid 304 may have any design providing the in-phase and quadrature signals described herein without departing from the spirit and scope of the present disclosure.

In some embodiments, the wavelength detection stage 300 includes a balanced pair of photodiodes 212a, 214a for the in-phase outputs of the 90-degree optical hybrid 304 for the generation of an in-phase (I-channel) differential signal as well as a balanced pair of photodiodes 212b, 214b for the quadrature outputs of the 90-degree optical hybrid 304 for the generation of a quadrature (Q-channel) differential signal. In this regard, the I-channel and Q-channel differential signals may be referred to as detection signals associated with a particular wavelength detection stage 300 wherein the unbalanced interferometer (202, FIG. 2A) and/or PIC 302 has a particular FSR. For example, the I-channel differential signal $i_I$ and the Q-channel differential signal $i_Q$ may be described as:

$$i_I = \gamma E_{in}^2 \cos\left(2\pi \frac{OPD}{\lambda}\right) \quad (7)$$

$$i_Q = \gamma E_{in}^2 \sin\left(2\pi \frac{OPD}{\lambda}\right) \quad (8)$$

In embodiments, the optical carrier 104 may be generated and provided to the wavelength detection stage 300 via a swept wavelength tunable laser 324 or like photonic source. For example, the swept wavelength tunable laser 324 may scan a defined wavelength range (e.g., from 1525 to 1565 nm, including the range 1545-1555 nm shown by FIG. 2B) at a defined repetition rate (e.g., every 100 ms), each repetition period corresponding to a measurement time.

In embodiments, the wavelength detection stage 300 may include a multi-point wavelength reference path 326 for environmentally insensitive (e.g., temperature- and stress-insensitive) broadband high accuracy wavelength calibration of the I-channel and Q-channel differential signals respectively output by balanced photodiodes 212a-214a and 212b-214b. The wavelength reference path 326 may provide multi-point wavelength calibration in the spectral region corresponding to the wavelength range of the swept wavelength tunable laser 324. For example, wherein the wavelength swept tunable laser 324 scans a wavelength range from 1525 to 1565 nm, the wavelength reference path 326 may include an optically couplable absorption cell containing hydrogen cyanide ($H_{13}C_{14}N$) gas (e.g., NIST SRM 2519/2519a).

In embodiments, the wavelength reference path 326 may provide an absorption spectrum comprising an environmentally insensitive set of reference absorption points of the optical carrier 104 by the contained gas. For example, the set of reference absorption points (e.g., in the optical domain) may be input to a reference photodiode 328 for conversion to the electrical domain.

In embodiments, the wavelength detection stage 300 may include analog-digital converters (ADC) for digitization of the electrical-domain output of the balanced photodiodes 212a-214a, 212b-214b and the reference photodiode 328. For example, an I-channel ADC 330, Q-channel ADC 332, and reference ADC 334 may respectively digitize the I-channel differential signal, the Q-channel differential signal, and the set of reference absorption points generated by the wavelength reference path. In embodiments, the I-channel ADC 330, Q-channel ADC 332, and reference ADC 334 may each be synchronized to the swept wavelength tunable laser 324 such that measurements received by the ADC are timestamped to the appropriate measurement time period. For example, the logic device 106 may receive the I-channel differential signal, the Q-channel differential signal, and the set of reference absorption points in the digital domain from the I-channel ADC 330, Q-channel ADC 332, and reference ADC 334 respectively, and may synchronize the ADCs to the swept wavelength tunable laser 324 via synchronization signal 336.

Figure 4:
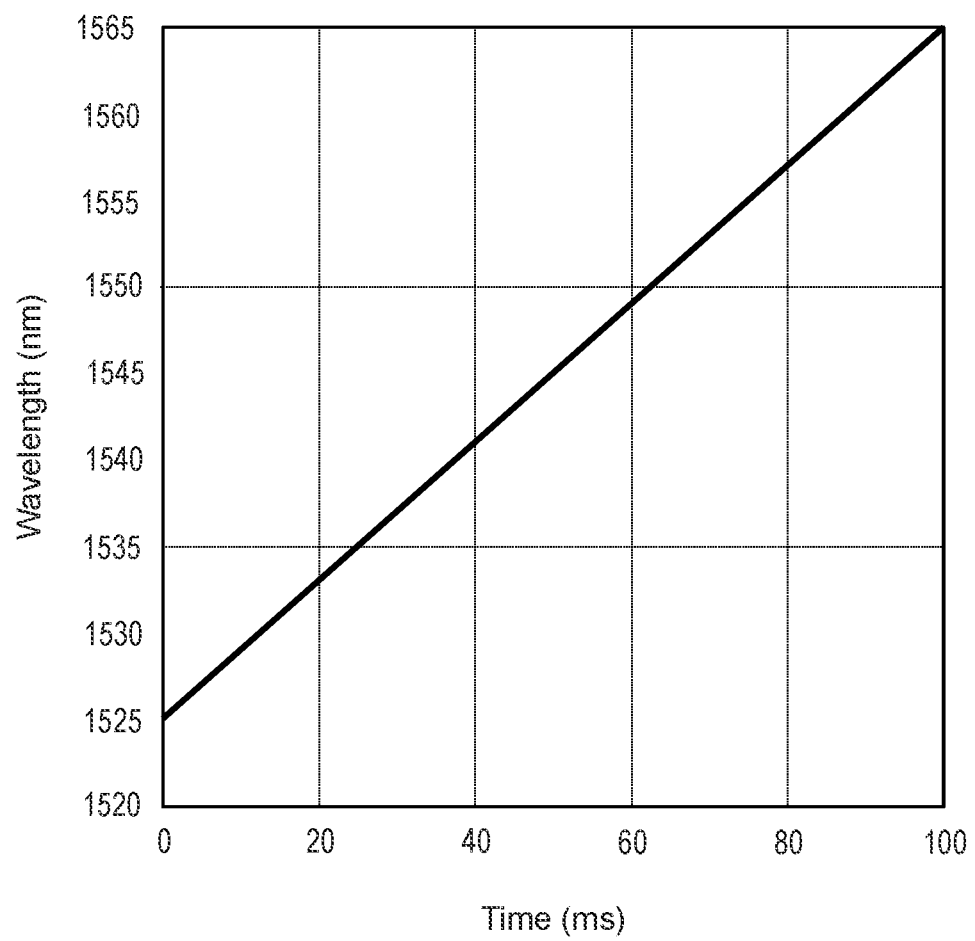
FIG. 4 is a plot of a representative optical carrier output of a swept wavelength tunable laser source over a measurement time window of the wavelength detection stage of FIG. 3.

Referring now to FIG. 4, a plot 400 is shown of a linear scan of the wavelength $\lambda$ of the optical carrier (104, FIG. 3) output by the swept wavelength tunable laser (324, FIG. 3) of the wavelength detection stage (300, FIG. 3) over a measurement time period of 100 ms. In embodiments, the optical carrier 104 output by the swept wavelength tunable laser 324 may, within each measurement time, preferably be substantially linear in wavelength over time. Any deviation from linearity, however, may be calibrated later by the logic device (106, FIG. 3) as disclosed in greater detail below.

Figure 5:
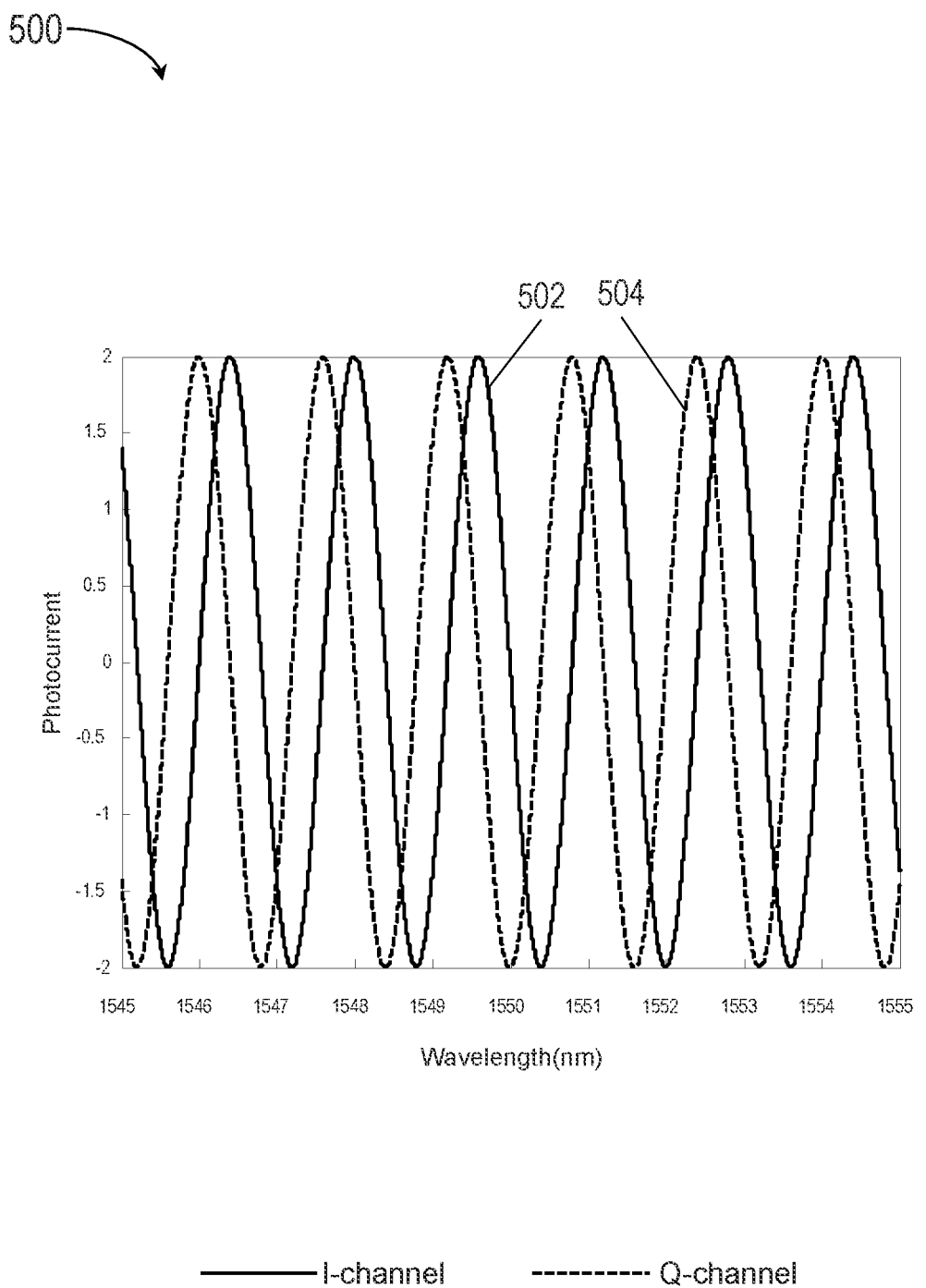
FIG. 5 is a plot of the in-phase channel (I-channel) signal and a quadrature channel (Q-channel) differential outputs of a wavelength detection stage including a 90-degree optical hybrid of FIG. 3.

Referring now to FIG. 5, a plot 500 is shown of the I-channel differential signal 502 and Q-channel differential signal 504 output by the respective balanced photodetector pairs (FIG. 3: 212a-214a, 212b-214b) of the wavelength detection stage 300 including a 90-degree optical hybrid (304, FIG. 3). As illustrated by equations (7) and (8) above, and as shown by FIG. 5, the I-channel and Q-channel differential signals 502, 504 are both sinusoidal with a 90-degree phase-shift between them generated by the 90-degree optical hybrid 304. Further, as described with respect to the unbalanced interferometer 202 of FIG. 2A, the common period of the I-channel and Q-channel differential signals 502, 504 is related to the OPD between the first and second arms (FIG. 3: 206, 208).

It is contemplated herein that the arctangent of the ratio of the Q-channel and I-channel differential signals 504, 502

$$\left(\text{e.g., } \arctan\frac{i_Q}{i_I}\right)$$

is linear as a function of the wavelength $\lambda$ of the optical carrier 104 within a periodic series of intervals corresponding to the period of the Q-channel and I-channel differential signals, which may be characterized as the free spectral range (FSR) of the wavelength detection stage 300. Accordingly, the wavelength A of the optical carrier 104 may be readily determined based on the arctangent of the ratio of the Q-channel and I-channel differential signals 504, 502.

Figure 6:
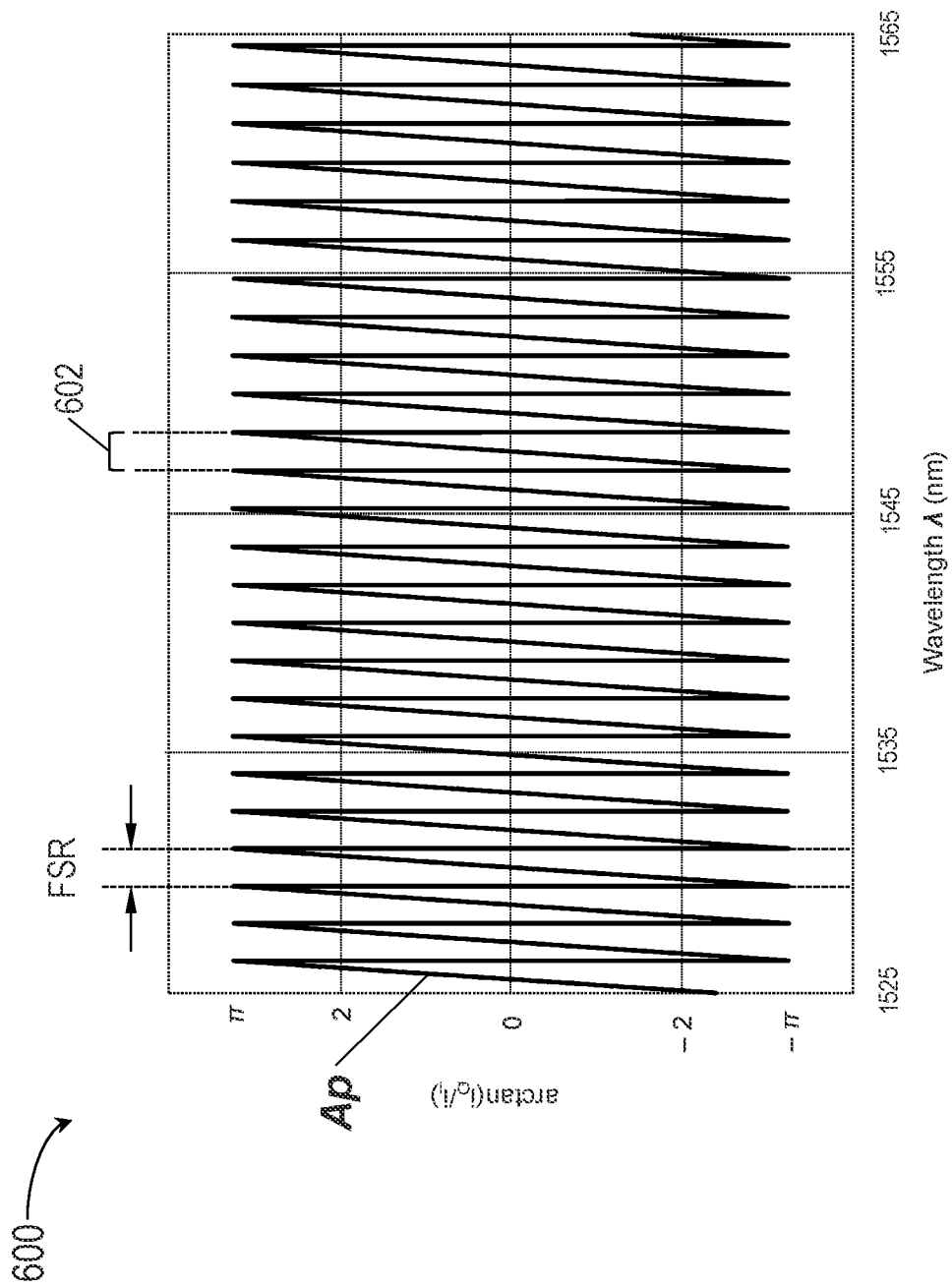
FIG. 6 is a plot of the arctangent of the ratio of the I-channel and Q-channel signals as a function of the wavelength of the optical carrier of FIG. 4.

Referring now to FIG. 6, a plot 600 is shown of the arctangent of the ratio of the Q-channel and I-channel differential signals 504, 502

$$\left(\text{e.g., } \arctan\frac{i_Q}{i_I}\right)$$

as a function $A_p(\lambda)$ of the wavelength $\lambda$ of the optical carrier 104 according to an embodiment of the inventive concepts disclosed herein.

As shown by FIG. 6, $$\arctan\frac{i_Q}{i_I}$$

may be linear as a function of wavelength (Ap(λ)) within a periodic series of intervals 602 (e.g., regions, FSR regions) corresponding to the period of the Q-channel and I-channel differential signals 504, 502 and likewise corresponding to the free spectral range (FSR) of the wavelength detection stage 300. Similarly, a plot of $$\arctan\frac{i_Q}{i_I}$$

may be linear within the FSR (e.g., interval 602) of the wavelength detection stage 300. Additionally, the arctangent of the ratio of the Q-channel and I-channel differential signals 504, 502 may be linear as a function of the wavelength of the optical carrier 104. Accordingly, the I-channel and Q-channel differential signals 502, 504 may be sampled, stored, or otherwise characterized as a function of the wavelength (or optical frequency).

In some embodiments, the logic device 106 may receive the I-channel and Q-channel differential signals 502, 504 from the photodiodes 212a-214a, 212b-214b associated with the wavelength detection stage 300 (e.g., via I-channel and Q-channel ADCs (FIG. 3: 330, 332)) and may calculate the arctangent of the ratio of the Q-channel and the I-channel differential signals $$\left(\text{e.g., } \arctan\frac{i_Q}{i_I}\right.$$

or alternatively $$\left.\arctan\frac{i_Q}{i_I}\right),$$

herein referred to as an arctangent signal. Further, the logic device 106 may provide any selected output signal equal to or indicative of the wavelength (or, e.g., of the optical frequency) of the optical carrier 104. In one embodiment, the logic device 106 may output the value of the arctangent signal, which is indicative of the wavelength (or optical frequency) of the optical carrier 104. In another embodiment, the logic device 106 may determine and output a value of the wavelength or optical frequency of the optical carrier 104 based on the arctangent signal.

It is contemplated herein that the FSR (e.g., region 602) of a particular wavelength detection stage 300 wherein the PIC 302/unbalanced interferometer (202, FIG. 2A) is associated with a particular OPD between the respective arms (e.g., the first and second arms 206, 208 shown by FIG. 3) is effectively also the operational range of the wavelength detection stage 300 in this configuration. For example, if the wavelength of the optical carrier 104 is limited to a range within the FSR (e.g., within a linear region ranging from values of −π to +π, as shown by FIG. 6), the value of the arctangent signal may linearly map to the optical wavelength in this range.

It is further contemplated herein that the wavelength resolution of the wavelength detection stage 300 may be inversely related to the FSR of the PIC 302/unbalanced interferometer 202 of the wavelength detection stage 300. For example, the slope of each linear region 602 may be inversely related to the FSR, as the value of $$\arctan\frac{i_Q}{i_I}$$

varies between −π and +π within each FSR. Accordingly, the selection of the FSR of a wavelength detection stage 300, which is related to the OPD between the first and second arms 206, 208, may involve a tradeoff between the allowable wavelength range for the optical carrier 104 and the resolution of the wavelength detection stage 300 to shifts in the wavelength within this range.

In some embodiments, the wavelength detection system 100 may generate two or more sets of detection signals associated with different free spectral ranges or corresponding operational ranges. For example, each set of detection signals may include I-channel and Q-channel differential signals 502, 504 from a particular wavelength detection stage 300 having a particular FSR. In this regard, the wavelength detection system 100 may provide various levels of sensitivity and operational range. For example, a wavelength detection system 100 including two sets of differential signals may provide a "coarse" wavelength measurement within a relatively large operational range and a "fine" wavelength measurement within a relatively short wavelength range.

In embodiments, the wavelength detection system 100 may be configured to generate multiple sets of differential signals with different free spectral ranges either simultaneously or sequentially. In some embodiments, a wavelength detection system 100 may include multiple wavelength detection stages 300, each stage associated with a different free spectral range (e.g., different OPDs between first and second arms 206, 208 of the respective PIC 302/unbalanced interferometer 202), where each wavelength detection stage 300 receives a portion of the optical carrier 104 (e.g., from a beamsplitter, or the like). Accordingly, the logic device 106 may simultaneously receive the multiple sets of detection signals from the multiple wavelength detection stages 300. Further, any combination of sequential and simultaneous operation is within the spirit and scope of the present disclosure. In some embodiments, the FSR of one set of detection signals is selected to be an integer multiple of the FSR of another set of detection signals. In this regard, the wavelength detection system 100 may effectively provide the operational range based on the longer FSR and a sensitivity (e.g., slope of the arctangent signal) based on the shorter FSR.

Figure 7:
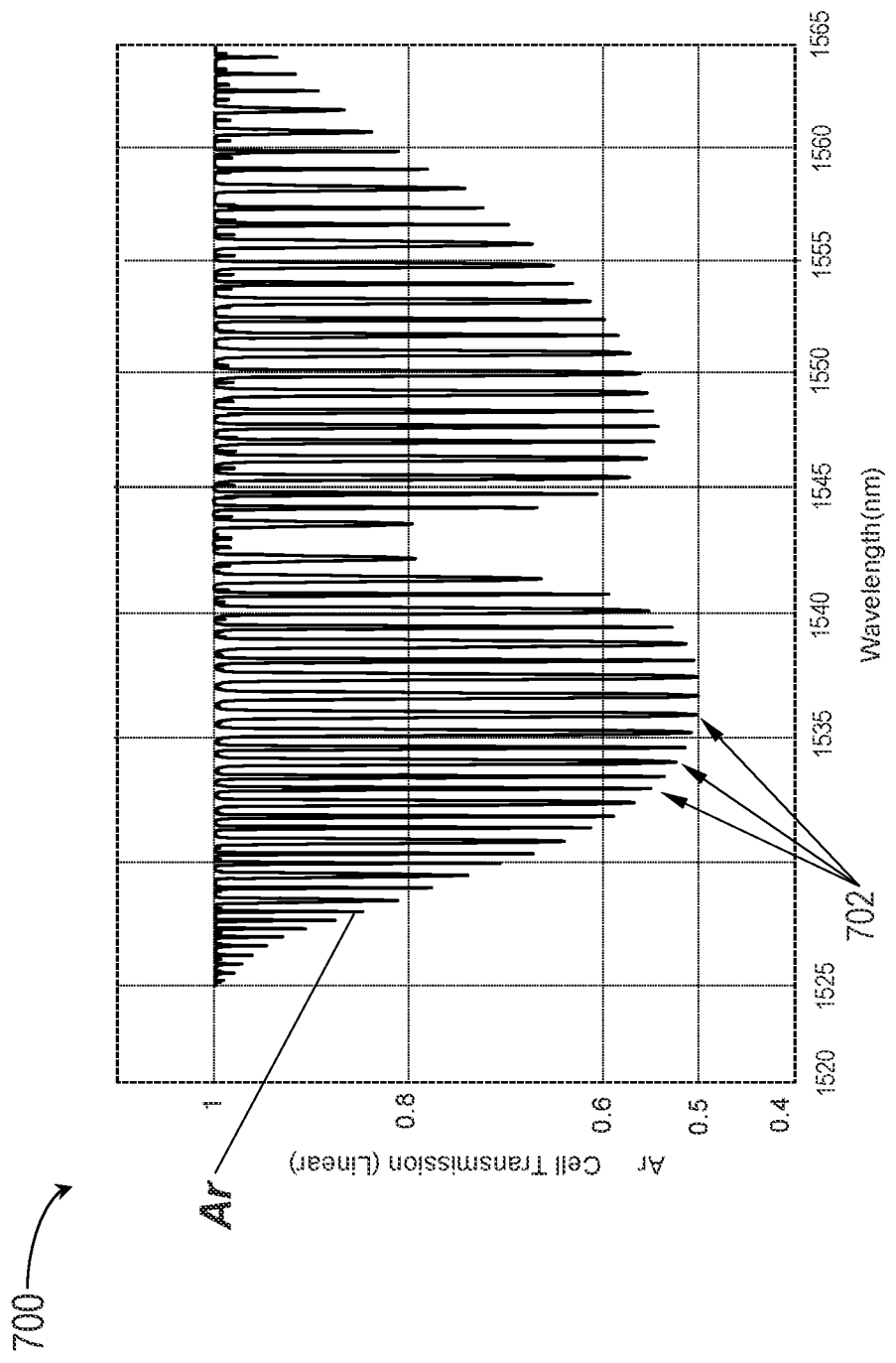
FIG. 7 is a plot of the wavelength reference absorption spectrum associated with a wavelength reference path of the wavelength detection stage of FIG. 3.

Referring to FIG. 7, a plot 700 is shown of cell transmission data, e.g., a function Ar (e.g., Ar(λ)) of the wavelength range of the swept wavelength tunable laser (324, FIG. 3) through its measurement time period (e.g., 100 ms, as shown by FIG. 4). For example, wherein the wavelength range of the swept wavelength tunable laser 324 corresponds to 1525-1565 nm (see also, e.g., FIGS. 4 and 6), the plot 700 of the cell transmission function Ar may correspond to a normalized spectrum of the absorption of the swept wavelength tunable laser by (e.g., the $H_{13}C_{14}N$ contained within) the wavelength reference path (326, FIG. 3), and each relative minimum 702 may correspond to a specific reference absorption wavelength, e.g., a certified center wavelength as noted by SRM 2519/2519a. In embodiments, the set of reference wavelengths may be dependent on the specific wavelength reference path 326, and the selected wavelength reference path may likewise be dependent on the desired wavelength range of the swept wavelength tunable laser 324.

Figure 8:
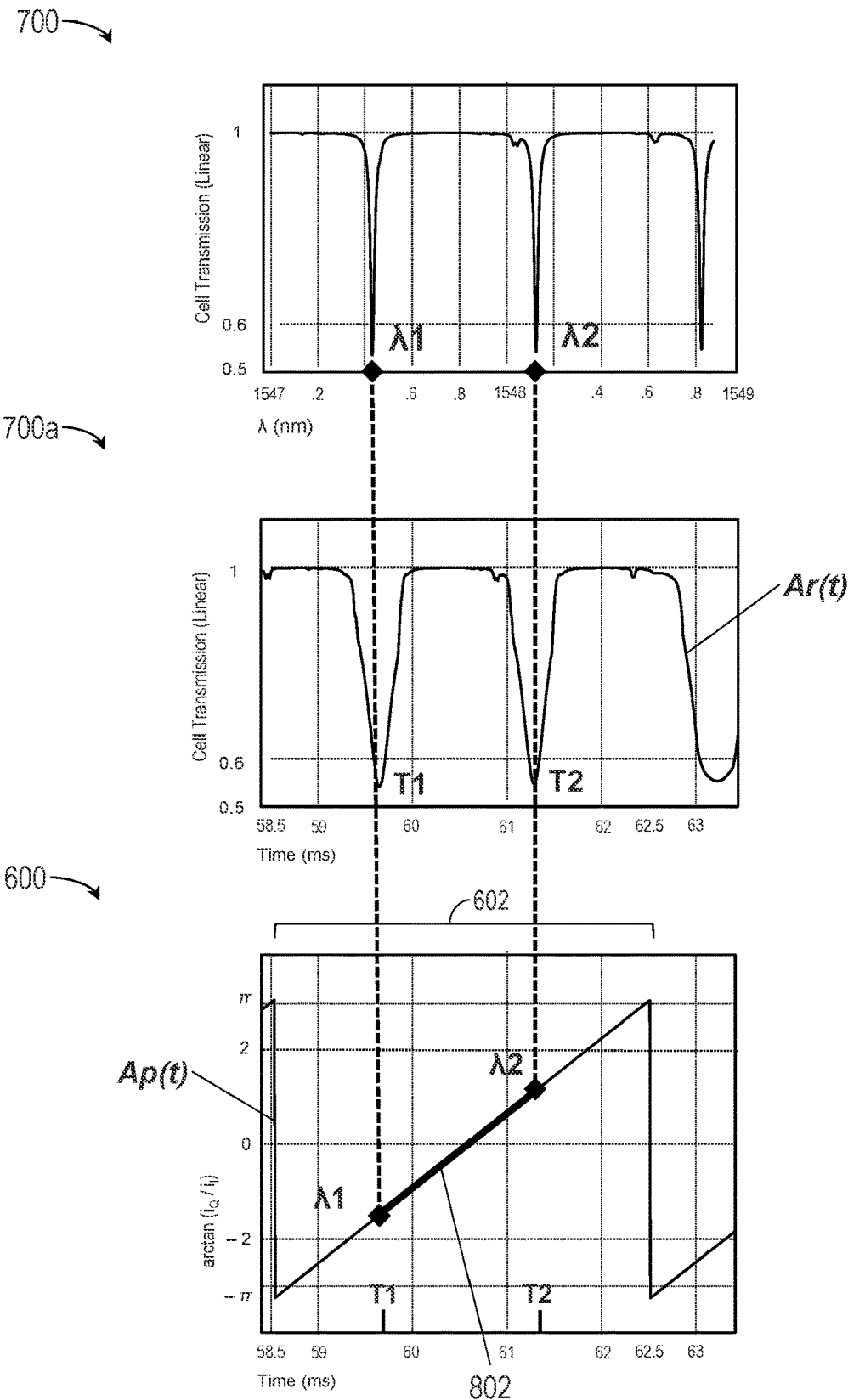
FIG. 8 is a diagrammatic illustration of a wavelength detection operation of the wavelength detection stage of FIG. 3.

Referring now to FIG. 8, three plots are shown.

The plot 700 shows cell transmission data corresponding to the wavelength reference path (326, FIG. 3) as a function of the wavelength range of the swept wavelength tunable laser 324 (e.g., a portion of the set of reference wavelengths shown in full by FIG. 7 and stored by the logic device 106).

The plot 700a may be implemented similarly to the plot 700, except that the plot 700a may correspond to the output of the reference ADC (334, FIG. 3), which plots (e.g., in the digital domain) the set of reference wavelengths as a function (Ar(t)) of the measurement time period of the swept wavelength tunable laser 324.

The plot 600a shows a portion (e.g., corresponding to one or more regions 602 of the arctangent signal shown by FIG. 6, e.g., the arctangent of the ratio of the Q-channel and I-channel differential signals (FIG. 5: 504, 502; e.g., as digitized and received by the logic device (FIG. 3; 106)) as a function (Ap(t)) of the measurement time period of the swept wavelength tunable laser 324.

In embodiments, the wavelength detection stage 300 may determine the wavelength A of the optical carrier 104 (e.g., at a given time within the measurement time period of the swept wavelength tunable laser 324) based on the arctangent signal shown by the plot 600a and the set of reference wavelengths shown by the plots 700, 700a. For example, the output of the I-channel and Q-channel ADCs (FIG. 3: 330, 332), e.g., the digitized I-channel and Q-channel differential signals 502, 504, may be collected and used by the logic device 106 for calculation of the function Ap(t)=f[λ(t)] (as shown by the plot 600a), or the arctangent of the ratio of the Q-channel and I-channel differential signals $$\left(e.g., \arctan\frac{i_Q}{i_I}\right)$$

as a function of the measurement time period of the swept wavelength tunable laser 324. As also shown by the plot 600a, the function Ap(t) is preferably linear within each FSR region 602 (as noted above, the function Ap(t) may be calibrated if not perfectly linear).

In embodiments, cell transmission absorption wavelengths of the optical carrier 104 (e.g., as determined by the wavelength reference path (326, FIG. 3)) may correspond to relative minima of the function Ar(t) as shown by the plot 700a. For example, each relative minimum of the function Ar(t) may correspond to an absorption wavelength and to a timestamp t, and may therefore be mapped to cell transmission data corresponding to the wavelength reference path 326 as a function of the wavelength range of the swept wavelength tunable laser 324 (e.g., as shown by the plot 700) to determine accurate absorption wavelengths, e.g., absorption wavelengths λ1 and λ2 of the optical carrier 104 by the wavelength reference path at the respective timestamps T1 and T2. As the function Ap(t) is preferably linear within each FSR region 602, any wavelength at a time between T1 and T2 (e.g., and within the region 802 between λ1 and λ2) may be accurately interpolated according to the function Ap(t), e.g., the value Ap(t₁) of $$\arctan\frac{i_Q}{i_I}$$

at the point corresponding to the time [T(i₁)].

Figure 9:
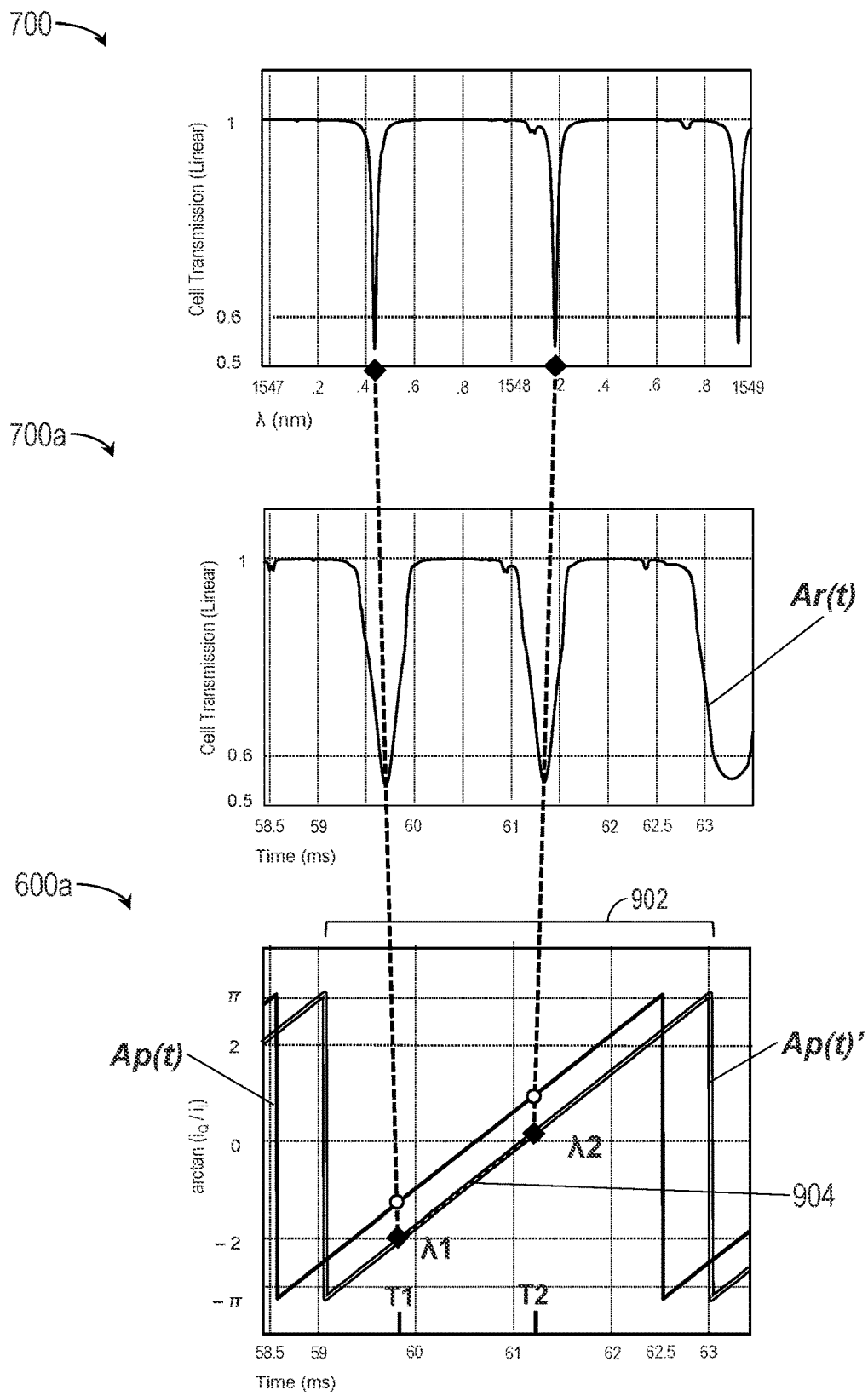
FIG. 9 is a diagrammatic illustration of a wavelength detection operation of the wavelength detection stage of FIG. 3, wherein the output of the wavelength detection stage is shifted due to environmental effects.

Referring now to FIG. 9, the plot 600a may be implemented similarly to the plot 600 of the function Ap(t)

$$\left(e.g., \arctan\frac{i_Q}{i_I}\right)$$

relative to me measurement time period of the swept wavelength tunable laser (324, FIG. 3) as shown by FIG. 8, except that the plot 600a may phase shift Ap(t) to reflect environmental effects (e.g., temperature, stress) on the I-channel and Q-channel differential signals (FIG. 5: 502, 504) output by the PIC (302, FIG. 3) of the wavelength detection stage (300, FIG. 3), introducing potential error into wavelength measurements. For example, the function Ap(t)' may present a linear shift of 90° out of phase relative to the function Ap(t). This phase shift may likewise shift the FSR regions 902 relative to wavelength, as well as the corresponding value of $$\arctan\frac{i_Q}{i_I}$$

at any measurement time.

Accordingly, in embodiments the logic device 106 may likewise map timestamped (e.g., T1, T2) reference absorption wavelengths λ1 and λ2 from the function Ar(t) shown by the plot 700a to the phase-shifted function Ap(t)' rather than to the function Ap(t). For example, by calibrating to the region 904 of the function Ap(t)' between λ1 and λ2 (e.g., and to the corresponding value of $$\arctan\frac{i_Q}{i_I}$$

from which the wavelength λ of the optical carrier 104 may be interpolated for any time between T1 and T2), the logic device 106 may cancel out the effect of the environmentally shifted PIC output (e.g., output of the wavelength detection stage 300) and the corresponding error in measuring the wavelength A of the optical carrier.

Figure 10:
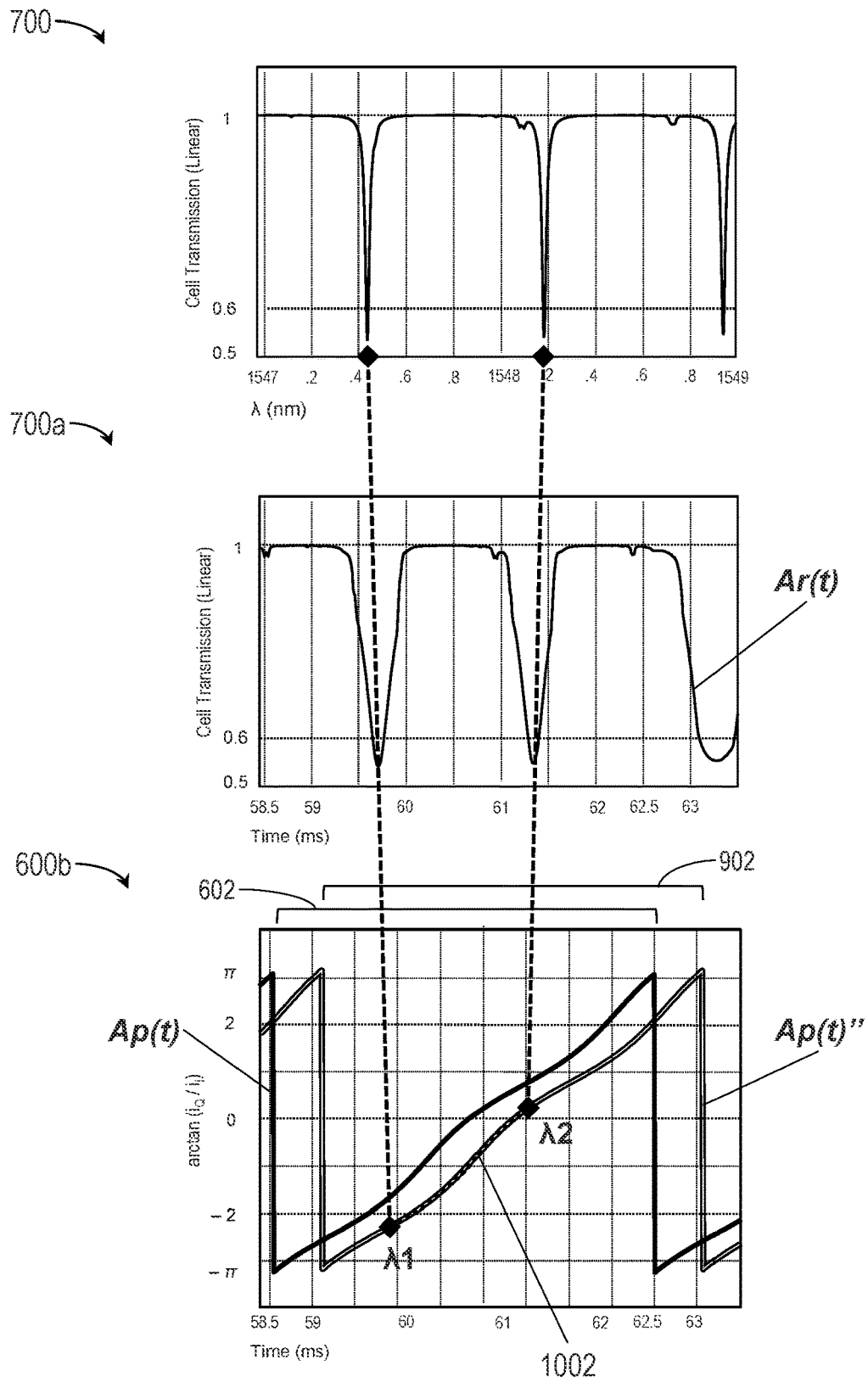
FIG. 10 is a diagrammatic illustration of a wavelength detection operation of the wavelength detection stage of FIG. 3, wherein the output of the wavelength detection stage is shifted due to environmental effects and non-linear over time/wavelength.

Referring now to FIG. 10, the plot 600b may be implemented similarly to the plot 600 of the function Ap(t)

$$\left(e.g., \arctan\frac{i_Q}{i_I}\right)$$

relative to the measurement time period of the swept wavelength tunable laser (324, FIG. 3) as shown by FIG. 8, except that the plot 600b may reflect environmental effects inducing a phase shift of the function Ap(A) (e.g., as shown by the plot 600 of FIG. 6), and therefore a shift of Ap(t) to a non-ideal I/Q phase in degrees (e.g., 70°) such that the function Ap(t) and phase-shifted function Ap(t)" shown by the plot 600b are non-linear relative to measurement time within respective FSR regions (602, 902). For example, the region 1002 of the phase-shifted function Ap(t)" between wavelengths λ1 and λ2 (at timestamps T1 and T2) may have a different shape than the counterpart region of the function Ap(t). However, by calibrating the wavelength λ of the optical carrier 104 based on the value of $$\arctan \frac{i_Q}{i_I}$$

as indicated by the region 1002 of the phase-shifted function Ap(t)" rather than the function Ap(t), the logic device 106 may, similarly to FIG. 9, cancel out the effect of the environmentally shifted PIC output (e.g., output of the wavelength detection stage 300) on the wavelength λ.

Figure 11:
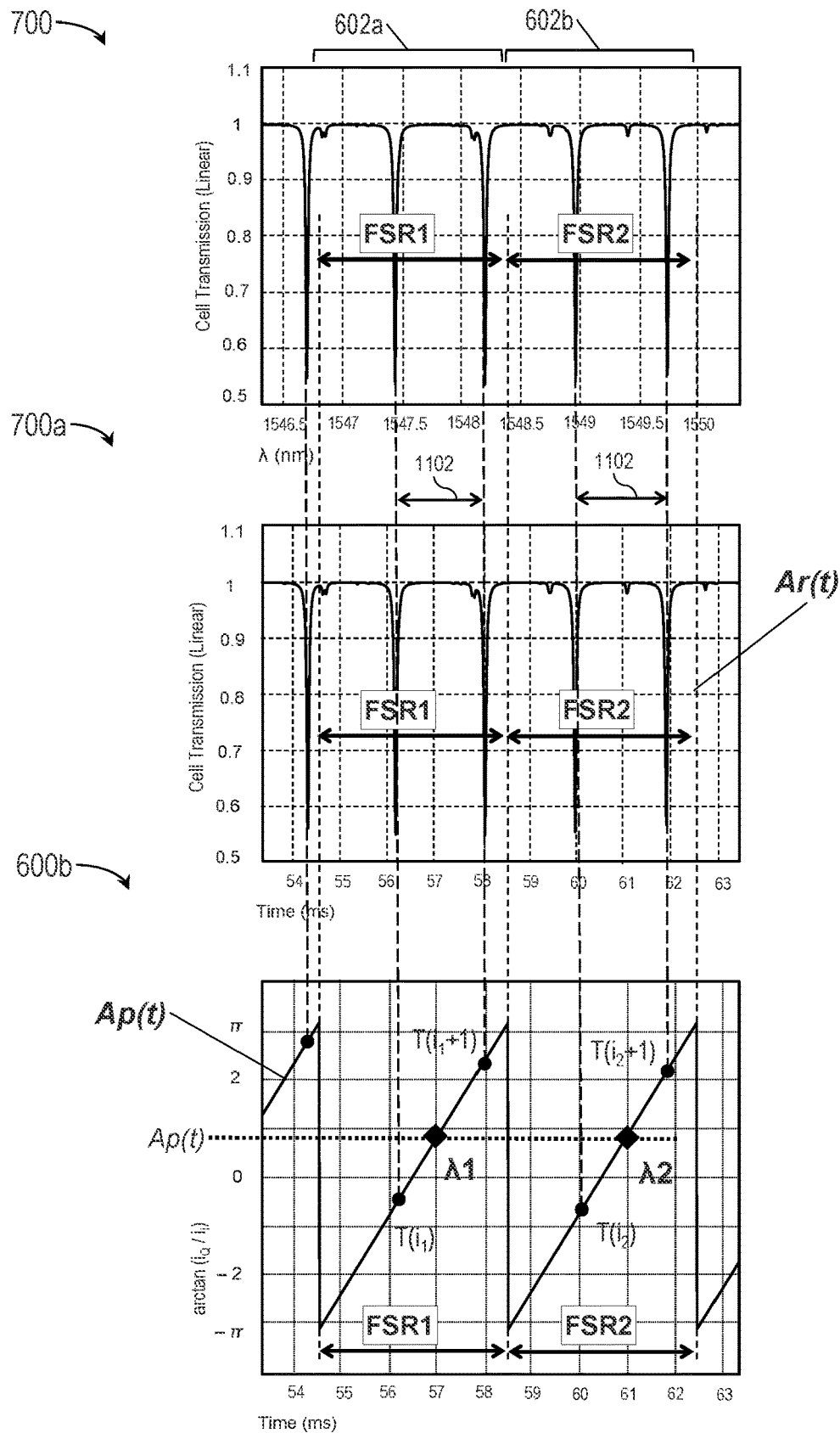
FIG. 11 is a diagrammatic illustration of a free spectral range (FSR) section identification operation of the wavelength detection stage of FIG. 3.

Referring now to FIG. 11, the plots 700, 700a, and 600 are shown.

In embodiments, the wavelength detection stage 300 shown by FIG. 3 and incorporating the wavelength reference path 326 may further contribute to the identification of free spectral range (FSR) sections or regions within the function Ap(t) shown by the plot 600. For example, when designing the PIC/wavelength detection stages (302/300, FIG. 3), the size of FSR sections 602a, 602b must be larger than the maximum spacing (1102) of absorption wavelengths as indicated by the wavelength reference path 326 and as shown by the plot 700, such that the spacing between pairs of adjacent calibration points DIN, [T($i_1$), T($i_1$+1)], [T($i_2$), T($i_2$+1)] is smaller than the scan time corresponding to the current FSR (602a, 602b) of the wavelength detection stage 300.

In embodiments, the logic device 106 may calculate the wavelengths λ1 and λ2 from different FSR sections 602a, 602b of the function Ap(t) based on, e.g., reference channel information as received from the reference ADC (334, FIG. 3) corresponding to absorption wavelengths of the optical carrier 104 by the wavelength reference path 326 at the timestamps T($i_1$), T($i_1$+1) (or, e.g., T($i_2$), T($i_2$+1)), and an output value Ap($t_1$) of the function Ap(t).

Figure 12:
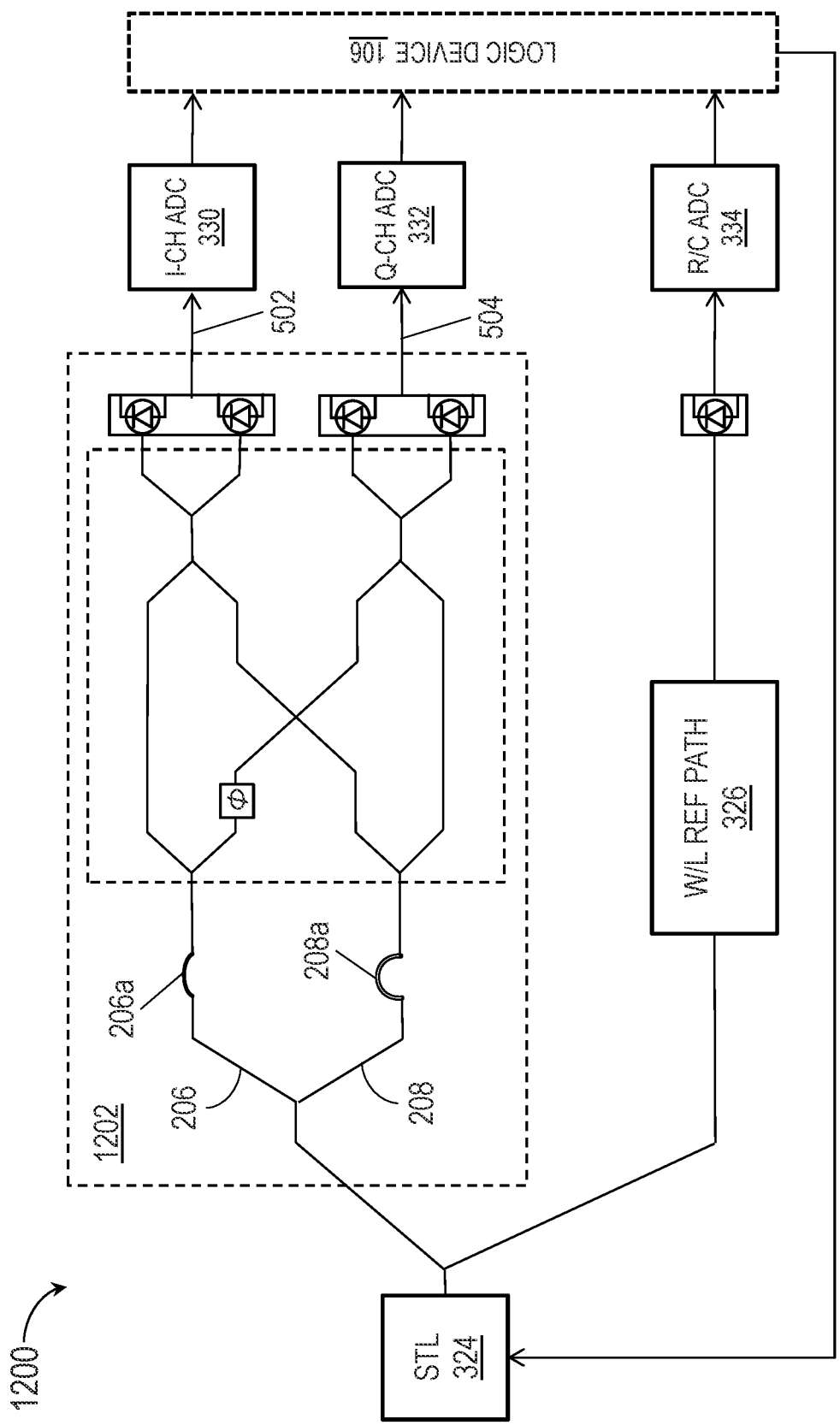
FIG. 12 is a conceptual view of a wavelength detection stage including an unbalanced interferometer incorporating athermal design, 90-degree optical hybrid, and wavelength reference path according to example embodiments of the inventive concepts disclosed herein.

Referring now to FIG. 12, the wavelength detection stage 1200 and PIC 1202 may be implemented and may function similarly to the wavelength detection stage 300 and PIC 302 of FIG. 3, except that the PIC 1202 of the wavelength detection stage 1200 may reduce or minimize overall thermal impact on the PIC output (e.g., the I-channel and Q-channel differential signals 502, 504) via athermal design. In embodiments, the first and second arms 206, 208 of the unbalanced interferometer (202, FIG. 2) of the PIC 1202 may each incorporate portions 206a, 208a wherein the first material of the first portion 206a of the first arm 206 is different than the second material of the second portion 208a of the second arm 208. The first portion 206a and the second portion 208a may be selected and/or fashioned as disclosed by U.S. patent application Ser. No. 17/145,090, which application is herein incorporated by reference in its entirety. For example, the first material and the second material may be selected to differ according to any combination of various properties, e.g., different waveguide group indexes, different thermal sensitivities (e.g., refractive index derivatives), different lengths. In embodiments, the FSR of the PIC 1202 may be based on differences in material properties between the first portion 206a/first arm 206 and the second portion 208a/second arm 208.

Referring now to FIG. 13A, the method 1300 may be implemented by the wavelength detection system 100 (including the wavelength detection stages 102, 300, and/or 1200 and may include the following steps.

At a step 1302, the wavelength detection system receives (e.g., via the one or more wavelength detection stages) an optical carrier. For example, the optical carrier is split into first and second arms, the optical path length difference (OPD) between the first and second arms associated with a free spectral range (FSR) of the unbalanced interferometer/photonic integrated circuit (PIC) of the wavelength detection stage. The split optical carrier is received by a 90-degree optical hybrid which provides two in-phase channel (I-channel) outputs and two quadrature channel (Q-channel) outputs based on the input signal. The I-channel outputs are converted into an electrical-domain I-channel differential signal via an I-channel differential photodetector (e.g., balanced photodiode pair), and the Q-channel outputs are converted into an electrical-domain Q-channel differential signal via a Q-channel differential photodetector. The optical carrier is also received by a multi-point wavelength reference path, providing a set of reference absorption wavelengths within the range of the optical carrier. The set of reference absorption wavelengths is likewise converted into the electrical domain by a reference photodetector. The I-channel differential signal, Q-channel differential signal, and set of reference absorption wavelengths are digitized by analog-digital converters (ADC) in the wavelength detection stage. In some embodiments, the optical carrier is received from a swept wavelength tunable laser configured for output having a substantially linear output through a set wavelength range over a set measurement time, the wavelength range associated with the set of reference absorption wavelengths. In some embodiments, the I-channel and Q-channel differential signals are phase-shifted due to temperature, stress, or other environmental effect on the interferometer arms of the PIC, introducing potential error into wavelength measurement. In some embodiments, the first and second interferometer arms of the PIC are at least partially athermal, e.g., fashioned from different materials that differ from each other in length, group index, thermal sensitivity, etc.

At a step 1304, a logic device of the wavelength detection system receives one or more sets of detection signals, each set of detection signals comprising a digitized I-channel differential signal, Q-channel differential signal, and set of reference absorption wavelengths all corresponding to a common measurement time of the swept wavelength tunable laser.

At a step 1306, the logic device determines, for each received set of detection signals, a corresponding wavelength of the optical carrier based on 1) an arctangent of a ratio of the I-channel and Q-channel differential signals and 2) the corresponding set of reference absorption wavelengths. In some embodiments, a first and second arctangent of the ratio of I-channel and Q-channel differential signals, respectively corresponding to first and second calibration timestamps, are mapped to first and second reference absorption wavelengths as measured by the wavelength reference path. In some embodiments, an intermediate wavelength between the first and second reference absorption wavelengths and corresponding to an intermediate calibration time (and an intermediate arctangent value) is interpolated based on a linear relationship of wavelength over time between the two reference absorption wavelengths (e.g., within a common free spectral range (FSR) region or section). In some embodiments, the arctangent signal may be phase-shifted, e.g., by environmental effect on the interferometer arms of the PIC and therefore on the PIC output, e.g., the I-channel and Q-channel differential signals, as to be non-linear within the FSR region or section. Accordingly, the determination of the wavelength of the optical carrier cancels out the phase shift in the arctangent signal (and, e.g., any wavelength measurement error associated with the phase shift due to shifts in individual arctangent values corresponding to timestamps).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A wavelength detection system, comprising:
one or more wavelength detection stages configured to receive at least one portion of a narrow wavelength band optical carrier, each wavelength detection stage comprising:
a splitter configured to split the at least one portion of the optical carrier into a first arm and a second arm, wherein a free spectral range (FSR) associated with the respective wavelength detection stage is associated with an optical path length difference between the first and second arms;
a 90-degree optical hybrid configured to receive the at least one portion of the optical carrier from the first arm and the second arm, the 90-degree optical hybrid configured to provide two in-phase channel (I-channel) outputs and two quadrature channel (Q-channel) outputs;
an I-channel differential photodetector configured to generate an I-channel differential signal based on a difference between the two I-channel outputs;
a Q-channel differential photodetector configured to generate a Q-channel differential signal based on a difference between the two Q-channel outputs;
a multipoint wavelength reference path configured to receive a portion of the optical carrier and provide a set of environmentally insensitive absorption wavelengths;
a reference photodetector configured to receive the set of reference absorption wavelengths and provide a corresponding electrical-domain set of reference absorption wavelengths;
an I-channel analog-digital converter (ADC) configured to digitize the I-channel differential signal;
a Q-channel ADC configured to digitize the Q-channel differential signal;
and
a reference ADC configured to digitize the set of absorption wavelengths;
and
a logic device in communication with the I-channel ADC, the Q-channel ADC, and the reference ADC, the logic device configured to:
receive one or more sets of detection signals from each wavelength detection stage, each set of detection signals comprising the digitized I-channel differential signal, the digitized Q-channel differential signal, and the digitized set of absorption wavelengths, each set of detection signals corresponding to a measurement time of the optical carrier;
and
for each set of detection signals, determine at least one wavelength of the associated optical carrier based on:
an arctangent of a ratio of the I-channel differential signal and
the Q-channel differential signal;
and
the set of absorption wavelengths.

2. The wavelength detection system of claim 1, wherein the optical carrier is generated by a swept wavelength tunable laser source configured for linear output across a defined wavelength range over the measurement time, the defined wavelength range associated with the set of reference absorption wavelengths.

3. The wavelength detection system of claim 1, wherein the logic device is configured, for each set of detection signals, to determine the at least one wavelength of the associated optical carrier by:
mapping at least a first arctangent and a second arctangent of the ratio of the I-channel and Q-channel differential signals, wherein the first and second arctangent respectively correspond to a first and second calibration time, to a first and second reference absorption wavelength of the set of absorption wavelengths.

4. The wavelength detection system of claim 3, wherein the logic device is configured, for each set of detection signals, to determine the at least one wavelength of the associated optical carrier by interpolating at least one intermediate wavelength between the first and second absorption wavelengths, the at least one intermediate wavelength corresponding to an intermediate calibration time between the first and second calibration times.

5. The wavelength detection system of claim 1, wherein:
the set of detection signals is associated with a phase shift caused by an environmental effect on the wavelength detection system, the environmental effect including at least one of a thermal effect or a stress effect;
and
the determination of the at least one wavelength is configured to cancel out the phase shift.

6. The wavelength detection system of claim 5, wherein the arctangent of the ratio of the I-channel differential signal and the Q-channel differential signal is substantially non-linear over time.

7. The wavelength detection system of claim 1, wherein the one or more wavelength detection stages comprise at least one photonic integrated circuit (PIC).

8. The wavelength detection system of claim 1, wherein each 90-degree optical hybrid comprises:
a first-arm splitter configured to split the at least one portion of the optical carrier from the first arm into a first optical path and a second optical path;

a second-arm splitter configured to split the at least one portion of the optical carrier from the second arm into a third optical path and a fourth optical path;
a phase delay configured to introduce a 90-degree phase shift to the portion of the optical carrier in the second optical path;
a first coupler to receive the portion of the optical carrier from the first and third optical paths, wherein outputs of the first coupler form the two I-channel outputs; and
a second coupler to receive the portion of the optical carrier from the second and fourth optical paths, wherein outputs of the second coupler form the two Q-channel outputs.

9. The wavelength detection system of claim 1, wherein:
at least a portion of the first arm is formed of a first material;
at least a portion of the second arm is formed of a second material, the second material and the first material differing with respect to one or more of group index and thermal sensitivity;
the first arm is associated with a first length; and
the second arm is associated with a second length different from the first length.

10. A wavelength detection method, comprising:
receiving at least one portion of an optical carrier via one or more wavelength detection stages, each wavelength detection stage comprising:
  a splitter configured to split the at least one portion of the optical carrier into a first arm and a second arm, wherein a free spectral range (FSR) associated with the respective wavelength detection stage is associated with an optical path length difference between the first and second arms;
  a 90-degree optical hybrid configured to receive the at least one portion of the optical carrier from the first arm and the second arm, the 90-degree optical hybrid configured to provide two in-phase channel (I-channel) outputs and two quadrature channel (Q-channel) outputs;
  an I-channel differential photodetector configured to generate an I-channel differential signal based on a difference between the two I-channel outputs;
  a Q-channel differential photodetector configured to generate a Q-channel differential signal based on a difference between the two Q-channel outputs;
  a multipoint wavelength calibration reference configured to receive a portion of the optical carrier and provide a set of environmentally insensitive absorption wavelengths; and
  a reference photodetector configured to receive the set of absorption wavelengths and provide a corresponding set of absorption wavelengths in the electrical domain;
  an I-channel analog-digital converter (ADC) configured to digitize the I-channel differential signal;
  a Q-channel ADC configured to digitize the Q-channel differential signal; and
  a reference ADC configured to digitize the set of absorption wavelengths;
receiving, via a logic device in communication with the one or more wavelength detection stages, one or more sets of detection signals, each set of detection signals comprising the digitized I-channel differential signal, the digitized Q-channel differential signal, and the digitized set of absorption wavelengths, each set of detection signals all corresponding to a measurement time of the optical carrier; and
determining for each set of detection signals, via the logic device, at least one wavelength of the associated optical carrier based on:
  an arctangent of a ratio of the I-channel differential signal and the Q-channel differential signal; and
  the set of absorption wavelengths.

11. The method of claim 10, wherein receiving at least one portion of an optical carrier via one or more wavelength detection stages includes:
receiving at least one portion of an optical carrier from a swept wavelength tunable laser source configured for linear output across a defined wavelength range over the measurement time, the defined wavelength range associated with the set of absorption wavelengths.

12. The method of claim 10, wherein determining for each set of detection signals, via the logic device, at least one wavelength of the associated optical carrier includes:
mapping at least a first arctangent and a second arctangent of the ratio of the I-channel and Q-channel differential signals, wherein the first and second arctangent respectively correspond to a first and second calibration time, to a first and second absorption wavelength of the set of absorption wavelengths.

13. The method of claim 12, wherein determining for each set of detection signals, via the logic device, at least one wavelength of the associated optical carrier includes:
interpolating at least one intermediate wavelength between the first and second absorption wavelengths, the at least one intermediate wavelength corresponding to an intermediate calibration time between the first and second calibration times.

14. The method of claim 10, wherein the set of detection signals is associated with a phase shift caused by an environmental effect on the one or more wavelength detection stages, the environmental effect including at least one of a thermal effect or a stress effect, and:
wherein determining for each set of detection signals, via the logic device, at least one wavelength of the associated optical carrier includes:
canceling out the phase shift associated with the set of detection signals.

15. The method of claim 14, wherein the arctangent of the ratio of the I-channel differential signal and the Q-channel differential signal is substantially non-linear over time.

16. The method of claim 10, wherein:
at least a portion of the first arm is formed of a first material;
at least a portion of the second arm is formed of a second material, the second material and the first material differing with respect to one or more of group index and thermal sensitivity;
the first arm is associated with a first length; and
the second arm is associated with a second length different from the first length.

* * * * *